US009120245B1

(12) United States Patent
Pechenik et al.

(10) Patent No.: US 9,120,245 B1
(45) Date of Patent: *Sep. 1, 2015

(54) METHODS FOR FABRICATION OF PARTS FROM BULK LOW-COST INTERFACE-DEFINED NANOLAMINATED MATERIALS

(71) Applicant: The United States of America, as represented by the Secretary of the Air Force, Washington, DC (US)

(72) Inventors: Alexander Pechenik, Getzville, NY (US); Wesley P. Hoffman, Palmdale, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 107 days.

This patent is subject to a terminal disclaimer.

(21) Appl. No.: 14/083,516

(22) Filed: Nov. 19, 2013

Related U.S. Application Data

(63) Continuation-in-part of application No. 12/980,831, filed on Dec. 29, 2010, now Pat. No. 8,617,456, which is a continuation-in-part of application No. 12/728,293, filed on Mar. 22, 2010, now Pat. No. 8,475,705.

(60) Provisional application No. 61/162,349, filed on Mar. 23, 2009.

(51) Int. Cl.
B29C 35/00 (2006.01)
(52) U.S. Cl.
CPC .................... B29C 35/00 (2013.01)
(58) Field of Classification Search
CPC ...................................................... B29C 35/00

USPC .................................................. 264/639, 650
See application file for complete search history.

(56) References Cited

U.S. PATENT DOCUMENTS 4,483,785 A 11/1984 Johnson et al.
4,615,735 A 10/1986 Ping
(Continued)

OTHER PUBLICATIONS

United States Patent and Trademark Office, Non-Final Action in U.S. Appl. No. 12/938,463, mailed Feb. 5, 2015, 23 pages total.
(Continued)

Primary Examiner — Joseph S Del Sole
Assistant Examiner — Russell Kemmerle, III
(74) Attorney, Agent, or Firm — AFMCLO/JAZ; Chastity Whitaker

(57) ABSTRACT

This present invention describes interface-defined nanolaminates (IDnLs), which are novel nanolaminate materials fabricated from metals and ceramics, and new methods for fabricating these IDnL materials, including new methods for manufacturing high aspect ratio parts comprising IDnL materials according to the present invention. IDnLs are fundamentally different from ordinary laminates in that their properties are defined by the interfaces between the layers rather by the properties of the bulk materials comprising the individual layers. In contrast to superlattice materials, IDnLs may be made thermally stable due to the wide selection of interface-defining materials, which allows judicial use of equilibrium phase diagrams. The degree of interface coherency in IDnLs may be varied to optimize material properties. In addition, IDnLs may be manufactured inexpensively in bulk, industrial quantities and large sizes by the techniques disclosed in this invention.

18 Claims, 3 Drawing Sheets

(56) References Cited

U.S. PATENT DOCUMENTS

| | | | |
|---|---|---|---|
| 4,627,892 | A | 12/1986 | Worrell et al. |
| 4,786,374 | A | 11/1988 | Worrell et al. |
| 4,915,605 | A | 4/1990 | Chan et al. |
| 4,943,320 | A | 7/1990 | Penchuk et al. |
| 5,204,055 | A | 4/1993 | Sachs et al. |
| 5,217,822 | A | 6/1993 | Yoshida et al. |
| 5,234,641 | A | 8/1993 | Rutt |
| 5,266,419 | A | 11/1993 | Yamada |
| 5,387,299 | A | 2/1995 | Singh et al. |
| 5,397,450 | A | 3/1995 | Sekhar et al. |
| 5,453,330 | A | 9/1995 | Kawasaki et al. |
| 5,509,978 | A | 4/1996 | Masumoto et al. |
| 5,561,829 | A | 10/1996 | Sawtell et al. |
| 5,687,679 | A | 11/1997 | Mullin et al. |
| 5,779,833 | A | 7/1998 | Cawley et al. |
| 5,788,738 | A | 8/1998 | Pirzada et al. |
| 5,984,997 | A | 11/1999 | Bickmore et al. |
| 5,997,800 | A | 12/1999 | Wimberger Friedl et al. |
| 6,020,419 | A | 2/2000 | Bock et al. |
| 6,048,577 | A | 4/2000 | Garg |
| 6,203,768 | B1 | 3/2001 | McCormick et al. |
| 6,207,038 | B1 | 3/2001 | Steil et al. |
| 6,312,643 | B1 | 11/2001 | Upadhya et al. |
| 6,410,160 | B1 | 6/2002 | Landin et al. |
| 6,447,712 | B1 | 9/2002 | Dogan et al. |
| 6,656,336 | B2 | 12/2003 | Mukundan et al. |
| 6,682,598 | B1 | 1/2004 | Steinmueller et al. |
| 6,709,628 | B2 | 3/2004 | Kleinlogel et al. |
| 6,787,080 | B1 | 9/2004 | Lange et al. |
| 6,800,158 | B2 | 10/2004 | Polikarpus et al. |
| 6,811,741 | B2 | 11/2004 | Pham et al. |
| 6,861,155 | B2 | 3/2005 | Bawendi et al. |
| 6,866,957 | B1 | 3/2005 | Bagger et al. |
| 6,908,568 | B2 | 6/2005 | Masuzawa et al. |
| 6,930,059 | B2 | 8/2005 | Conley et al. |
| 7,029,777 | B2 | 4/2006 | Mardilovich |
| 7,128,995 | B2 | 10/2006 | Higuchi et al. |
| 7,131,174 | B2 | 11/2006 | Kobayashi et al. |
| 7,186,368 | B2 | 3/2007 | Simwonis et al. |
| 7,214,333 | B2 | 5/2007 | Mukundan et al. |
| 7,438,837 | B2 | 10/2008 | Hatano et al. |
| 7,527,761 | B2 | 5/2009 | Swartzlander et al. |
| 7,595,127 | B2 | 9/2009 | Seabaugh et al. |
| 7,713,592 | B2 | 5/2010 | Nguyen et al. |
| 7,833,469 | B2 | 11/2010 | Swartzlander et al. |
| 7,947,212 | B2 | 5/2011 | Steele et al. |
| 8,197,885 | B2 | 6/2012 | Honecker et al. |
| 2002/0108854 | A1 | 8/2002 | Labarge et al. |
| 2002/0146611 | A1 | 10/2002 | Kawasaki et al. |
| 2002/0185376 | A1 | 12/2002 | Mukundan et al. |
| 2003/0027027 | A1 | 2/2003 | Cutler et al. |
| 2003/0027033 | A1 | 2/2003 | Seabaugh et al. |
| 2003/0090027 | A1 | 5/2003 | Smirnova et al. |
| 2003/0148160 | A1 | 8/2003 | Song et al. |
| 2003/0165726 | A1 | 9/2003 | Robert et al. |
| 2003/0224234 | A1 | 12/2003 | Steele et al. |
| 2004/0033886 | A1 | 2/2004 | Simwonis et al. |
| 2004/0104519 | A1 | 6/2004 | Chen et al. |
| 2004/0202919 | A1 | 10/2004 | Mardilovich et al. |
| 2004/0265483 | A1 | 12/2004 | Meyer et al. |
| 2005/0082726 | A1 | 4/2005 | Hilmas et al. |
| 2005/0095495 | A1 | 5/2005 | Yamada et al. |
| 2005/0095497 | A1 | 5/2005 | Yamada et al. |
| 2005/0275143 | A1 | 12/2005 | Toth |
| 2006/0049540 | A1 | 3/2006 | Hui et al. |
| 2006/0118158 | A1 | 6/2006 | Zhang et al. |
| 2006/0125157 | A1 | 6/2006 | Swartzlander et al. |
| 2007/0026285 | A1 | 2/2007 | Wang et al. |
| 2007/0077476 | A1 | 4/2007 | Lee et al. |
| 2007/0117006 | A1 | 5/2007 | Zhan et al. |
| 2007/0176332 | A1 | 8/2007 | Swartzlander et al. |
| 2007/0179040 | A1 | 8/2007 | Li et al. |
| 2007/0273070 | A1 | 11/2007 | Badding et al. |
| 2009/0188789 | A1 | 7/2009 | Honecker et al. |
| 2010/0028757 | A1 | 2/2010 | Fu et al. |
| 2010/0054981 | A1 | 3/2010 | Liu |
| 2010/0061877 | A1 | 3/2010 | Sadaka et al. |
| 2010/0126807 | A1 | 5/2010 | Liao et al. |
| 2010/0159356 | A1 | 6/2010 | Mahoney |
| 2010/0167170 | A1 | 7/2010 | Narendar et al. |
| 2010/0200427 | A1 | 8/2010 | Koike et al. |
| 2010/0292522 | A1 | 11/2010 | Chun et al. |
| 2011/0236743 | A1 | 9/2011 | Kumar et al. |
| 2012/0009507 | A1 | 1/2012 | Wood et al. |
| 2012/0049132 | A1 | 3/2012 | Marlin et al. |
| 2012/0094214 | A1 | 4/2012 | Zahid et al. |
| 2012/0119420 | A1 | 5/2012 | Rossignol et al. |
| 2012/0141916 | A1 | 6/2012 | Robert et al. |
| 2013/0251900 | A1 | 9/2013 | Zinn |

OTHER PUBLICATIONS

United States Patent and Trademark Office, Advisory Action in related U.S. Appl. No. 12/152,128, mailed on Jun. 5, 2012, 2 pages.

United States Patent and Trademark Office, Final Office in related U.S. Appl. No. 12/152,128, mailed on Mar. 12, 2012, 24 pages.

United States Patent and Trademark Office, Non-Final Office Action in related U.S. Appl. No. 12/152,128, mailed on May 19, 2011, 14 pages.

United States Patent and Trademark Office, Final Office Action in related U.S. Appl. No. 12/938,463, mailed on Feb. 15, 2013, 8 pages.

United States Patent and Trademark Office, Non-Final Office Action in related U.S. Appl. No. 12/938,463, mailed on Aug. 1, 2012, 20 pages.

L. Armelao et al., "Zirconium and hafnium oxoclusters as molecular building blocks for highly dispersed $ZrO_2$ or $HfO_2$ nanoparticles in silica thin films," J. Mat. Chem., vol. 15 (2005) 1838-1848.

Z. Q. Jin et al., "Shock compaction of bulk nanocomposite magnetic materials," Mat. Sci. Forum., vol. 465-466 (2004) 93-100.

T. G. Neih et al., "Dynamic compaction of aluminum nanocrystals," Acta Mater., vol. 44 (1996) 3781-3788.

C. B. Bargeron et al., "Oxidation of Hafnium Carbide in the Temperature Range 1400° to 2060°C." J Amer Ceram Soc., vol. 76 (1993) 1040-1046.

K. Jia et al., "Abrasion resistance of nanostructured and conventional cemented carbides," Wear, vol. 200 (1996) 206-214.

Y. Wang et al., "Abrasive wear characteristics of plasma sprayed nanostructured alumina/titania coatings," Wear, vol. 237 (2000) 176-185.

T. Sundararajan et al., "High temperature corrosion of nanoceria coated 9Cr-1Mo ferritic steel in air and steam," Surface and Coatings Technology, vol. 201 (2006) 2124-2130.

R. M. Costescu et al., "Ultra-Low Thermal Conductivity in $W/Al_2O_3$ Nanolaminates," Science, vol. 303 (2004) 989-990.

United States Patent and Trademark Office, Non-Final Office Action in related U.S. Appl. No. 12/938,462, mailed on Jul. 16, 2013, 21 pages.

Chen et al., "Novel equipment for the study of compaction of fine powders," J. Amer. Ceramic Soc., vol. 77 (1994) 1005-1010.

I. Kim et al., "Age-hardening associated with grain boundary precipitation in a commercial dental gold alloy," J. Oral Rehab., vol. 26 (1999) 215-222.

M. Suzuki et al., "Synthesis of silicon carbide-silicon nitride composite ultrafine particles using a carbon dioxide laser," J. Am. Ceramic Soc., vol. 76 (1993) 1195-1200.

A. S. Utada et al., "Dripping, jetting, drops, and wetting: the magic of microfiuids," MRS Bull., vol. 32 (2007) 702-708.

D. W. Matson et al., "Production of fine powders by the rapid expansion of supercritical fluid solutions (retroactive coverage)," Adv. Ceramics., vol. 21 (1986) 109-120.

A. E. Berkowitz et al., "Establishing exchange bias below TN with polycrystalline ni0.52Co0.480/Co bilayers," Phys. Rev. B., vol. 72 (2005) 134428, 9 pages total.

J. Garcia-Barriocanal et al., "Colossal ionic conductivity at interfaces of epitaxial $ZrO_2$:$Y_2O_3$ISrTiO3 heterostructures," Science, vol. 321 (2008) 676-680.

(56) References Cited

OTHER PUBLICATIONS

A. Gozar et al., "High-temperature interface superconductivity between metallic and insulating copper oxides," Nature Lett., vol. 455 (2008) 782-785.

R. C. O'Handley et al., "Phenomenology of giant magnetic-field-induced strain in ferromagnetic shape-memory materials," J. App. Phys., vol. 87 (2000) 4712-4717.

United States Patent and Trademark Office, Non-Final Office Action in U.S. Appl. No. 12/728,293, mailed Apr. 11, 2012, 9 pages total.

United States Patent and Trademark Office, Non-Final Office Action in U.S. Appl. No. 12/980,831, mailed Feb. 22, 2013, 11 pages total.

S. Zhang et al., "Coercivity induced by random field at ferromagnetic and antiferromagnetic interfaces," J. Magnetism Magnetic Mater., vol. 198-199 (1999) 468-470.

United States Patent and Trademark Office, Final Office Action in U.S. Appl. No. 12/938,462, mailed Jun. 27, 2014, 10 pages total.

METHODS FOR FABRICATION OF PARTS FROM BULK LOW-COST INTERFACE-DEFINED NANOLAMINATED MATERIALS

CROSS REFERENCE TO RELATED APPLICATIONS

This application is a continuation-in-part of, and claims priority from, co-pending U.S. patent application Ser. No. 12/980,831, filed on Dec. 29, 2010, which is a continuation-in-part of U.S. patent application Ser. No. 12/728,293, filed Mar. 22, 2010, now U.S. Pat. No. 8,475,705, which claims the benefit of U.S. Provisional Application No. 61/162,349, filed on Mar. 23, 2009, the disclosures of which are all incorporated herein by reference in their entirety. This application is related to co-pending U.S. patent application Ser. No. 12/938,463, filed Nov. 3, 2010, and co-pending U.S. patent application Ser. No. 12/938,462, filed Nov. 3, 2010, both of which are a continuation-in-part of U.S. patent application Ser. No. 12/152,128, filed May 8, 2008 (abandoned), which claims the benefit of U.S. Provisional Application No. 60/930,355, filed May 9, 2007, the disclosures of which are all incorporated herein by reference in their entirety.

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

This invention relates generally to the field of nanolaminates. More particularly, it relates to interface-defined nanolaminate materials and methods of making the same.

2. Description of the Related Art

In general, laminates are utilized in a variety of diverse fields and may be made with layers having a wide range of thickness. The terms "laminated materials" or "laminates" generally refer to materials that consist of many parallel, relatively thick layers (layer thickness>1 mm) of dissimilar materials. The properties of laminates are generally controlled by two factors: the properties of the material within the layers and the properties of the interfaces between the layers. When the number of layers is small (in this case a material usually referred to as "layered"), it is predominately the properties of the materials within the individual layers that define the properties of the whole laminate. However, as the number of layers increases, the properties of the interfaces between the dissimilar layers begin to impose an ever-increasing effect on the properties of the laminate. In some applications, it is the properties of the interfaces that are the determining factor in the performance of the whole laminate. For example, a reflecting insulator that consists of a number of metallic layers, each of which is an excellent conductor of heat and is separated from the next reflector by an air gap or vacuum, is, nevertheless, an excellent insulator because of the reflection and scattering of heat perpendicular to the metal/gas interfaces.

Laminates have many industrially useful properties. The properties of laminates are anisotropic, so they are often referred to as "two-dimensional materials" because their properties in the plane of the layers and perpendicular to that plane are drastically different. For example, heat conductivity in the crystal plane and perpendicular to the crystal planes of pyrolytic graphite can differ by three orders of magnitude; fracturing progresses easily within the individual glass planes in laminated glass but is quickly arrested in the direction perpendicular to the glass planes; electrical current propagates in but not perpendicular to the planes in metal/oxide laminates utilized in super-capacitors, etc. These anisotropic properties of laminates can be highly useful in impeding conduction of heat as well as fracture propagation, including damage caused by chemical attack. Regardless of the form of the propagating entity, laminate materials usually inhibit propagation of the energy or matter in the direction perpendicular to the layers, while dissipating this energy or matter principally along the surface (i.e. parallel to the plane of the layers) or within the interfaces.

From a conceptual point of view, the process of obstructing the energy propagation can be described by similar mathematics in all of these cases, as each interface constitutes a barrier that must be overcome by the incoming energy or matter in order to proceed through the material. Though each barrier may be small, the sheer number of them and their sequential nature ultimately overwhelms the incoming energy or matter and slows down its rate of flow through the material to a small fraction of the original value. To illustrate this point, consider, for example, that one barrier reflects or scatters only 0.01% (0.0001) of the incoming energy, letting 0.9999 through. 100,000 of these barriers placed at a distance of 100 nm apart would attenuate the flow of incoming energy to 1% of the starting value after a distance of only 1 cm. In most cases, the scattering at an interface is much higher than 0.01%. For the example of heat scattering at a metal/gas interface, the scattering is controlled by the emissivity and reflectivity of the metal surface, which can be above 50%. This high emissivity/reflectivity explains why only a few reflectors are often able to contain very high temperatures. However, even when the scattering coefficient is small, the sheer number of barriers gives tremendous power to the approach of laminated materials. This is one of the reasons why nanolaminates—laminates with individual layer thicknesses on the order of 1 to 999 nm and preferably from 1 to 100 nm—and superlattices, which are a subset of nanolaminates with coherent or atomically-coherent interfaces that produce distinctive superlattice peaks in X-ray diffraction, have attracted so much interest in the last several decades, both in research and industry.

In general, nanolaminates and superlattices are extremely finely-layered materials with individual layer thicknesses on the order of 1 to 10 nm. Traditionally, the term "superlattice" is used with layered materials that have coherent interfaces, i.e. the lattice planes are continuous from one phase to another across the interface. When the interfaces are incoherent, the material is usually referred to as "nanolayered." In the present application, "nanolaminate" and "nanolaminate materials" will be used generally to refer to materials with individual layer thicknesses up to 999 nm. These nanolaminate materials have been found to have very intriguing and industrially useful properties. Important new properties such as superior hardness/toughness combination, excellent wear resistance, supermodulus effects, superconductivity, optical waveguide properties, and magnetic properties are active areas of research in conventional nanolaminates.

Presently, despite their attractive properties, conventional nanolaminates have some very serious drawbacks from the point of view of industrial and commercial applications. With the exception of some high tech uses that require very small samples such as reading heads in magnetic storage, nanolaminates are prohibitively expensive for most industrial applications. Laminates with individual layer thicknesses of ≥100 microns may be made using relatively simple approaches that sequentially place one layer on top of the other, such as through the use of the "doctor blade" approach with powder pastes, electrophoretic deposition, spraying from different nozzles, pre-formed tapes, or by dipping in and/or painting on wet slurries. A few industrial methods to make bulk nanolayered materials exist, such as the manufacture of nanolayered materials comprising exfoliated graphite, vermiculate, and mica-type thermal insulation, which produces a single-component i.e. single composition material with incoherent interfaces; however, the continuity of individual layers in such materials is limited by the size of flakes, which is normally below 1 cm. A multiple-extrusion step approach has also been utilized in the electronics industry to make nanometer-thick layers in Channeltron photo-multiplier tubes and superconductor wires; however, neither of these methods is applicable to fabrication of bulk quantities of two-dimensional nanolayered materials.

Manufacture of nanolaminates with coherent interfaces currently requires the use of techniques such as chemical vapor deposition, physical vapor deposition, atomic layer deposition, pulsed laser deposition, electro-deposition, as well as magnetically and electrostatically-assisted sputtering, in which layers are built-up one atom at a time. These manufacturing methods are generally very slow (1 to 5 μm/min) and require expensive equipment, very clean conditions, and high vacuum, as the nanolaminates are essentially built-up one atom at a time. Nanolaminates manufactured by these techniques usually have semi-coherent (with dislocations) or coherent (no dislocations) interfaces because the slow-rate atomic deposition technique produces atomic uniformity of the interface. However, the sample size of materials made in this way is limited, and the cost to make commercial products with these techniques is prohibitive, making scale-up of these methods to industrially meaningful proportions unrealistic.

Manufacture of nanolaminates comprising shapes with a high aspect ratio such as tubes or rods presents additional challenges. For example, fuel cells require tubes with a high aspect ratio and high conductivity through the walls, while tubes comprising thermally-insulating materials require low conduction i.e. high thermal resistance along the length of the tube. To obtain a suitable nanolaminate tube, a very thick nanolaminate comprising many layers is made so that the tube may be machined through the nanolaminate i.e. so that the layers are perpendicular to the axis of the resulting tube. Manufacturing a high aspect ratio, nanolaminate part with a sufficient number of layers is thus extremely expensive, time-consuming, and impractical using conventional methods.

In addition, while laminates and nanolaminates with coherent interfaces possess many useful properties such as high conductivity, enhanced bonding, and minimum distortion across the interface, coherency is frequently undesirable as materials with coherent interfaces are usually quite brittle and have low thermal stability. The desired degree of coherency at each interface depends on the application. As stated above, laminate materials usually inhibit propagation of the energy or matter in the direction perpendicular to the layers, while dissipating this energy or matter along the surface or within the individual interfaces. Thus, to inhibit the propagation of energy, such as thermal energy or crack propagation perpendicular to the interfaces, it is desirable to have an incoherent interface between the layers of the laminate because coherent interfaces do not effectively scatter the energy perpendicular to them. Furthermore, because coherency at the interfaces leads to poor thermal stability, most superlattices are unstable even at room temperatures and quickly interdiffuse, losing their nanoscopic properties at or just above ambient temperatures. For these reasons, even where the properties of coherent interfaces may be desired, some departure from coherency is often needed to reduce the high strain energy associated with the coherent interfaces, thus assuring stability at elevated temperatures and improved mechanical properties. Such departures from ideal coherency are often induced by raising the temperature of the substrate or the rate of deposition during the magnetron-assisted sputtering of nanolaminates.

Thus, a need exists for an industrially-scalable batch or continuous technique to produce large amounts of lower-cost nanolaminates. In addition, a need exists for a process to fabricate a low-porosity nanolaminate material in which each interface has a cross-sectional area of ≥0.1 square meter.

SUMMARY OF THE INVENTION

This invention describes a class of nanolaminate materials that consist of a very large number of essentially parallel layers, with neighboring layers having a different composition or structure. Because the nanolaminate materials described herein are fabricated from powders that are eventually densified and consolidated, the materials possess very different properties and micro- and nanostructures, as compared to both ordinary laminates and superlattices. The sheer density of interfaces, which may be up to hundreds of thousands per centimeter of thickness of the material, creates novel, highly-desirable properties in these nanolaminate materials because the material properties are controlled principally by the engineered interfaces. This is in contrast to conventional nanolaminates in which the properties of the nanolaminate are controlled mainly by the properties of the materials used to fabricate the layers. Thus, an additional benefit to this technology is that the materials used to fabricate the layers do not have to control the rate of the energy flow through the material and as a result, these materials constituting the layers may be chosen to maximize another property of the nanolaminate.

In addition to these unique materials, this invention describes novel fabrication methods and techniques to fabricate large surface area, bulk nanolaminate materials that may form complex parts or structures in an economical, industrially-scalable manner. In one embodiment according to the present invention, a batch or continuous process for fabricating a high aspect ratio anisotropic nanolaminate part, such as a tube or rod, with a length:diameter ratio of at least five and a desired cross-sectional shape comprises the steps of: selecting at least one starting nanolaminate material comprising at least one thousand individual layers that comprise at least two different nanomaterials, with each adjacent layer comprising a different nanomaterial composition; machining the at least one starting nanolaminate material in a direction about perpendicular to a plane of the individual layers to produce at least two segments having the desired cross-sectional shape, in which each segment comprises a first end and a second end; and machining a surface of the first and second ends of each segment to produce a first and second machined surface, wherein each surface is machined such that the first and machined surfaces are substantially parallel to the plane of the individual layers.

The method continues with placing one segment into a constraining device such that one of the machined surfaces is accessible, with the constraining device preventing radial movement of the segment; applying a bonding layer to the accessible machined surface; and placing another segment in the constraining device such that one machined surface of the second segment is in contact with the bonding layer on the first segment and such that the other machined surface of the second segment is accessible, in which the constraining device prevents radial movement of the second segment with respect to the first segment and positions the second segment such that the two segments are located co-axially to form a multi-segment nanolaminate material.

The steps of applying a bonding layer to the accessible machined surface of the topmost segment and placing another segment on top such that one of its machined surfaces is in contact with the bonding layer and the other of its machined surfaces is accessible may be repeated until a total length of the multi-segment nanolaminate material is approximately equal to a desired total length of the high aspect ratio anisotropic nanolaminate part. Once the desired length is achieved, the method continues with compacting (without deforming) the multi-segment nanolaminate material in the constraining device in a direction about perpendicular to the plane of the individual layers to form a compacted multi-segment nanolaminate material, followed by consolidating the compacted multi-segment nanolaminate material to produce the high aspect ratio anisotropic nanolaminate part with a length:diameter ratio of at least five and the desired cross-sectional shape. The resulting high aspect ratio anisotropic nanolaminate part comprises at least two thousand individual layers that are numerous enough and thin enough such that at least one property of the high aspect ratio anisotropic nanolaminate part is mainly determined by a plurality of interfaces between the adjacent layers and to a lesser degree by properties of the at least two different nanomaterial compositions comprising the individual layers.

In some embodiments, a layer thickness of each of the individual layers is 1-100 nanometers. In other embodiments, the high aspect ratio anisotropic nanolaminate is thermally stable due to the "entropic stabilization" approach described herein. In further embodiments, the step of consolidating further comprises consolidating the compacted multi-segment nanolaminate material to at least 95% of theoretical density.

In alternative embodiments, the process further comprises removing the compacted multi-segment nanolaminate material from the constraining device prior to consolidating. In yet further embodiments, the process further comprises machining the high aspect ratio anisotropic nanolaminate part.

In some embodiments of the process, the step of consolidating the multi-segment nanolaminate material comprises utilizing at least one technique selected from the group consisting of atomic templating via cold consolidation, hot pressing, dynamic compaction, plastic deformation, liquid infiltration, microwave heating, and hot rolling. In some of those embodiments, the process further comprises annealing the consolidated high aspect ratio anisotropic nanolaminate at an elevated temperature sufficient to cause atomic rearrangement such that a desired degree of coherency at the interfaces is developed. In some of the embodiments comprising the annealing step, the high aspect ratio anisotropic nanolaminate is part is an ionic conductor in which the interfaces conduct ions in a radial direction and are coherent, unbroken, and continuous. In some embodiments of the ionic conductor, the at least two different nanomaterials of the ionic conductor are selected from the group consisting of 8% yttria-stabilized zirconia and strontium titanate.

In other embodiments of the process, the step of consolidating the compacted multi-segment nanolaminate material comprises utilizing at least one technique selected from the group consisting of short duration high temperature sintering, high temperature pressureless sintering, hot rolling, rapid hot pressing, and dynamic compaction to produce incoherent interfaces. In some of those embodiments, the high aspect ratio anisotropic nanolaminate part is an insulator that has an axial resistance that is at least two orders of magnitude greater than a radial resistance.

In some embodiments of the process, the at least one starting nanolaminate material is a compacted green nanolaminate, and in some of those embodiments, the bonding layer is a slurry comprising one of the at least two different nanomaterials comprising the compacted green nanolaminate.

In other embodiments of the process, the at least one starting nanolaminate material is a consolidated low porosity nanolaminate, in which the step of compacting the multi-segment nanolaminate material comprises compacting a joint that comprises the bonding layer and the step of consolidating the compacted multi-segment nanolaminate material comprises consolidating the joint. In some of those embodiments, the bonding layer is an adhesive. In some embodiments, the adhesive comprises at least one low-melting glass, and in some embodiments, the low-melting glass is selected from the group consisting of borosilicate and alumino-borosilicate. In other embodiments in which the at least one starting nanolaminate material is a consolidated low porosity nanolaminate, the bonding layer comprises a slurry that comprises one of the at least two different nanomaterials comprising the consolidated low porosity nanolaminate.

DETAILED DESCRIPTION OF THE INVENTION

Figure 1:
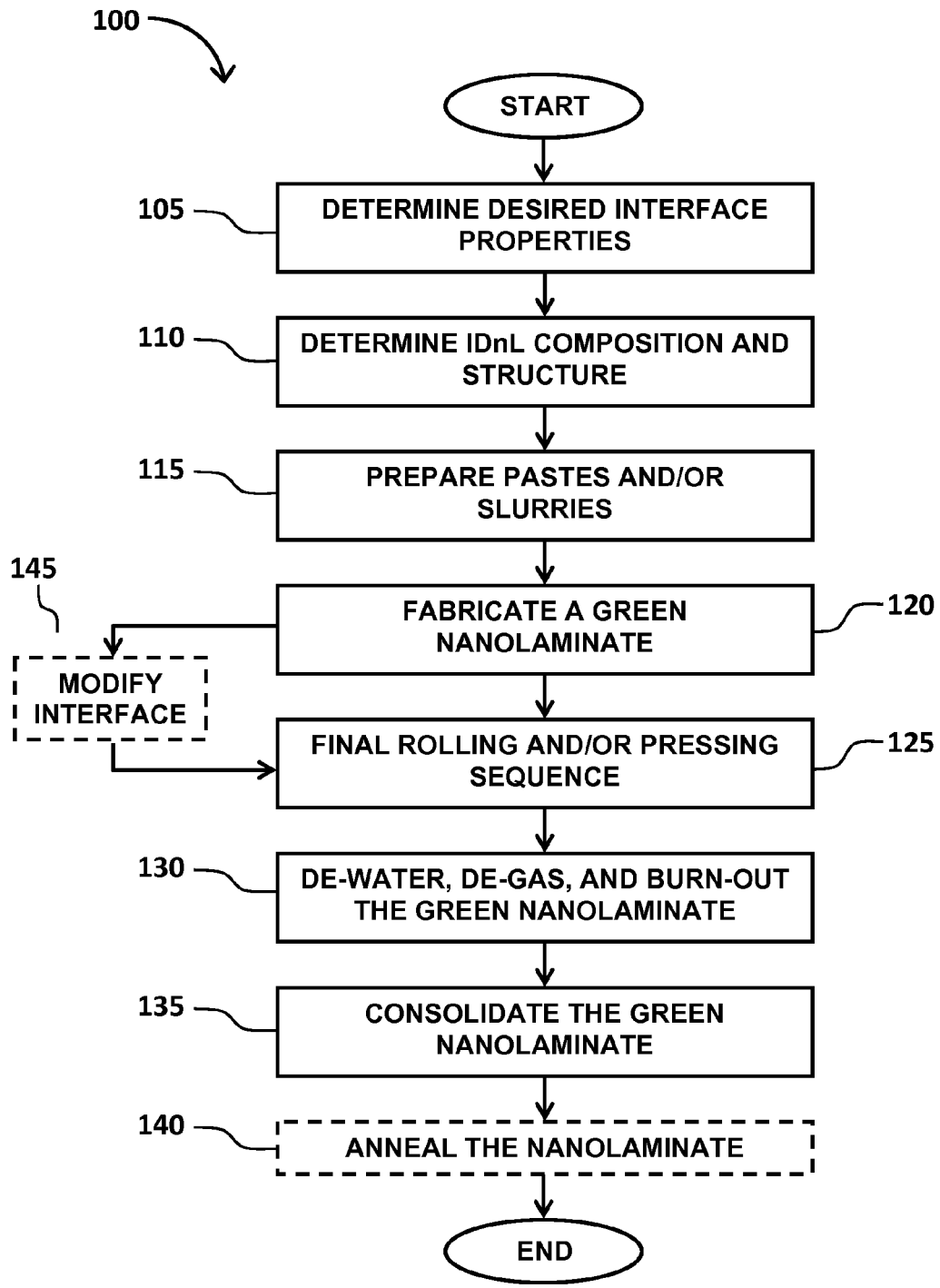
FIG. 1 is a flow diagram illustrating an exemplary embodiment of a method for making nanolaminate materials according to the present invention.

The present invention describes Interface-Defined nanoLaminate (IDnL) materials, which are novel nanolaminate materials fabricated from metals, ceramics, and other materials. The presently described IDnLs may have application in such diverse fields as fast ion conductors, magnetostrictive materials, semiconductors, hydrogen storage materials, superconductors, and environmental barrier materials and coatings. The interfaces between the layers of the IDnL materials may be designed and fabricated from many different materials. By varying the manufacturing process, the degree of atomic coherency may be varied from nearly coherent i.e. with lattice planes crossing from one material to another across the interface to completely incoherent i.e. where the lattice planes end at the interface. The present invention further includes low-cost methods to fabricate large (>0.1 square meter and preferably >1 square meter), bulk quantities of these nanolaminate materials, as well as methods for manufacturing high aspect ratio parts comprising IDnL materials. In the description of this invention, the terms "nano," "nanoscopic," "nanophase," "nanoscale," "nanosize", "nanograin," and "nanostructured" may be used interchangeably to describe the nanolaminate materials of this invention.

One crucial aspect of this invention is the utilization of the properties of the interfaces rather than the properties of the constituent materials within the layers of the nanolaminate. This is similar to the use of nanoparticles rather than traditional micron-sized particles in the fabrication of sintered metallic and ceramic parts. As particles that are compacted and consolidated into a monolithic body become smaller, the portion of atoms that reside in the grain boundaries increases, affecting the bulk properties of the body. In a similar manner, in the present invention, as the layers become thinner and more numerous, the influence of the interfaces eventually overshadows the influence of the material in the individual layers.

The IDnL materials described herein consist of at least 100, preferably more than 1000, and most preferably more than 100,000 continuous or non-continuous, parallel layer planes of micron, or preferably sub-micron, thickness in which the neighboring layers have a different composition and/or structure. The individual layers may be less than 5 microns thick, preferably less than 500 nm thick, and most preferably less than 100 nm thick. The presently disclosed methods for making IDnLs deal principally with ceramic and metallic powders in the form of slurries that may be sprayed, as well as pastes with a viscosity capable of plastic deformation without losing the continuity and integrity of each individual layer. Forging a monolithic material such as steel requires that the material deform plastically at the processing temperature. Unfortunately, most ceramic materials and many metals are much too hard and brittle, even at very high temperatures (500-1200° C.), to allow such processing. In other words, they do not deform plastically, making forging impossible. The instant invention circumvents this problem by starting with nanophase ceramic and/or metallic powders instead of monoliths.

The steps of the presently disclosed process include the layering of pastes each comprising nanopowders of different starting materials, followed by rolling or pressing of the composite made of the stacked pastes ("greenware") to decrease its thickness. Subsequently, prior to consolidation, the compressed and compacted greenware may be either folded onto itself or sectioned and stacked to increase the overall thickness and number of layers. In the final step, the prepared greenware is consolidated into the finished nanolaminate by using one or more suitable techniques such as sintering, rapid hot pressing, dynamic compaction, plastic deformation, liquid infiltration, plastic deformation, microwave heating, or hot rolling. The degree of coherency of the interfaces in the nanolaminate is greatly affected by the final consolidation procedure, with temperature, pressure, and the time at temperature being the key processing parameters.

In addition, every interface between the layers in the nanostructured materials produced via this invention is an interface between phase diagram-compatible, dissimilar materials, which enhances high temperature stability. The presently disclosed IDnLs are designed by first determining the desired properties of each interface and the density of such interfaces. The appropriate materials to achieve such properties are then selected, and the material is fabricated. In contrast to the designed interfaces of the present invention, the interfaces in conventional single-phase materials with micron-sized grains are actually grain boundaries between misaligned small crystals of the same phase material and are thus susceptible to grain growth at high temperatures.

Moreover, it should be noted that, if properly designed from the thermodynamic point of view so that only phases with limited or no solid state solubility are present, the IDnLs of the instant invention may share many of the thermodynamic properties of spinodal structures that are found in nature. Spinodal structures can have similar nanostructural interfacial features and also are known to have remarkable phase stability at high temperature. It also is known that spinodal structures greatly resist any kind of thermochemical changes because they are, at any given temperature, at a kinetically-stable state, which means that they evolve very slowly, if at all. Because of the thermodynamic stability requirement, not all attractive material combinations may be used as adjacent layers and/or surface coatings in the presently disclosed nanolaminates. The exact combination of the materials should be deduced from corresponding phase diagrams to assure that the phases are stable at the temperatures required for processing and service.

With proper design, the presently disclosed IDnLs should further possess many other stability features of spinodal structures, including chemical and mechanical stability. Some spinodals are known to be highly resistant to crack nucleation and growth because, like many incoherent layered structures, they are susceptible to crack branching and crack-tip blunting. Accordingly, the IDnLs that are the subject of the present invention, when processed to have incoherent interfaces, are also expected to have significantly increased fracture toughness, as represented in increased resistance to crack nucleation and crack propagation. All of these properties should lead to greatly improved mechanical strength, flaw tolerance, and thermal shock resistance in these materials.

Furthermore, in addition to the geometric effects described above, this invention enables one to achieve unique gains in reaction stability and reductions in high-temperature oxidation by taking advantage of the stabilizing forces of thermodynamic equilibrium that may be designed to operate on the nanometer scale. These forces lay entirely dormant in coarse-grain materials, which possess microstructures comprised of at least micron-sized features. It is necessary to maintain a state close to thermodynamic equilibrium between the adjacent dissimilar layers in these layered nanomaterials. The thermodynamic state of a system may be described using the Gibbs free energy equation shown in Equation (Eq.) (1) and the change in the Gibbs free energy shown by Eq. (2), where H is enthalpy, T is temperature, and S is entropy of the material system held under constant temperature and pressure:

$$G = H - TS \qquad \text{Eq. (1)}$$

$$\Delta G = \Delta H - T\Delta S \qquad \text{Eq. (2)}$$

The layered structure would be in thermodynamic equilibrium if the change in Gibbs free energy with grain growth or coarsening is greater than zero, $\Delta G > 0$. In other words, the driving force towards coarsening may be negated, thus making the layered nanomaterial thermally-stable, if $\Delta G > 0$ upon coarsening. In Eq. (2), $\Delta T = 0$ because the temperature is constant. The enthalpy change term in Eq. (2), $\Delta H$, is always negative with coarsening, thus driving the system towards increasing its feature size. However, the change of entropy term, $T\Delta S$, may be designed to be positive with dissimilar components on coarsening and may be made sufficiently large to override the $\Delta H$ term and make $\Delta G > 0$, thus preventing the system from coarsening caused by grain growth.

This state of increased thermal stability may be achieved by the judicious selection of the components of the layered nanomaterial, thus decreasing the Gibbs free energy of the layered nanomaterials to the point that any increase in feature size is thermodynamically unfavorable. It is quite scientifically unexpected and fortuitous that the force driving the system towards equilibrium may be increased as the dimensions decrease by the careful selection of the components, which maximizes the entropy of the interface. That is, by utilizing the nanoscale layers, the number of interfaces, and especially the type of the interface between the dissimilar layers in the material, the disorder in the material is greatly increased, which in turn increases the entropy of the system. Subsequently, the thermal stability is increased because of decreasing Gibbs free energy, ΔH−TΔS, in Eq. (2). The novelty, uniqueness, and power of this approach, which is termed here "entropic stabilization," lies in activating the true capabilities of the nanoscopic structuring made possible by using the appropriate thermodynamic considerations that arise only in dissimilar nanostructured materials and utilizing the unique processing approaches outlined below to achieve such nanostructures in bulk.

An additional concept of this invention is the unprecedented capability to incorporate additional pastes, surface coatings, and/or additives into the engineered interfaces. During the greenware processing steps, the outside surfaces may be coated with liquids or powders or other pastes may be added, which, in turn, are incorporated into the bulk of the material. Thus, a whole variety of graded materials and sequences of layers may be designed and formed in a very economical and industrially scalable manner.

It should be noted that when employing nanostructured materials in any application, there are two issues that should be addressed to make the application effective. First, a sufficiently high density of interfaces per unit of length through the thickness should be achieved in order to realize the predicted beneficial properties. Second, the issue of thermal stability of the produced structures should be addressed, evaluated, and managed, as any material that consists of nanoscale layers formed from consolidated nanosize particles contains very high energy associated with the enhanced area of interfaces.

The approach outlined in this invention addresses both of these issues. The present invention describes not only a method of manufacturing unique nanostructured materials that cannot be fabricated in other ways but also teaches a novel approach for stabilizing these nanostructures, even at extremely high temperatures, via the judicious selection of component materials based on known phase diagrams. Because the interfacial surface area of these structures is large, the assumption might be that these structures are thermally unstable. To eliminate any potential thermal instability, the material components are selected based on their high-temperature stability and absence of any liquid eutectics in the phase diagrams at the highest temperature of processing and service. In addition, the solid-state solubility may be controlled by pre-selecting the phases in such a way as to satisfy phase equilibrium and co-existence rules of the thermodynamic phase diagrams, which should be known or determined for each system.

Exemplary Methods of Manufacturing IDnL Materials

The procedures described in the present invention may offer remarkable flexibility in the design of nanolaminates of very complex structures, which may incorporate ceramics, metals, semiconductors, and polymers to achieve the desired mechanical, physical, and chemical properties. Referring now to the drawings, like reference numerals may designate like or corresponding parts throughout the several views, and one or more optional steps may be illustrated with dashed lines. The general steps in an exemplary method, which may be either a batch or continuous process, are described with respect to FIG. 1, which is a flow diagram or flowchart illustrating an exemplary embodiment of a method 100 for making nanolaminate materials according to the present invention.

Modeling

In FIG. 1, the first step in the process of fabricating an IDnL material is to determine the type of interface properties the IDnL material should have (Step 105). For example, if the projected material is a thermal insulator intended for exploitation at very high temperatures, the properties of the interfaces should include thermodynamic stability and/or kinetic stability for a specified duration at service temperatures. All mechanisms of heat transport should be taken into consideration, which in this case may include phononic and photonic heat transport, as well as the reflection and transmission coefficients at the designed interfaces evaluated. Also, some estimates of the degree of coherency should be performed.

After determining the desired interface properties in Step 105, the next step is to determine the composition and structure of the IDnL material (Step 110), including the composition of the materials in the layers, the exact sequence of the dissimilar layers, the structure and chemistry of the interfaces, the thickness of each of the layers in a direction perpendicular to the plane of the layers, the density of layers per unit of thickness of the nanolaminate, and any other parameters characterizing the exact structure of the nanolaminate material. One parameter that is not as important in the design of IDnL materials, as compared to laminated materials with much thicker layers, is the matching of the thermal expansion coefficients of the various constituents. This is due to the fact that the layers in IDnL materials are so thin that their individual thermal expansion produces little stress. All of the above may be achieved via extensive computer modeling and experimental studies of selected interfaces in bi-material junctions using, for example, phase diagrams.

The remarkable flexibility of the approach and the sheer number of adjustable parameters makes it imperative that the material be designed and modeled thoroughly prior to the actual fabrication. The presently disclosed IDnL materials may be thought of as a new class of materials—"materials-structures" as opposed to "structural materials"—and as the next step up from individual materials, making intelligent, computer-assisted engineering design of these materials-structures vital to achieve the desired interface atomic and microscopic structure and interfacial properties.

Constituents

Referring still to the method 100 in FIG. 1, the next step involves preparation of pastes and/or slurries (Step 115). Each paste/slurry comprises a nanopowder consisting of nanosize particles of a material selected in Step 110. Each paste or slurry that will ultimately form a nanolaminate layer may comprise metal, ceramic, alloy, or semiconductor particles, as well as a mixture of these constituents. Although laminates may be fabricated with particles in the micron and tens of micron range, for the instant invention, it is desired to use particles of preferably less than 500 nm and most preferably less than 100 nm in size. The particles should be classified before use, and the particle size should be selected in such a way as to give continuity to the ultimate layer thickness formed by these particles. That is, the particles are substantially (at least 3 times and preferably at least 10 times) smaller than the ultimate thickness of the resulting layer formed by these particles.

In most cases, if the particles are agglomerated, the agglomerates should first be broken up and refined by an appropriate technique, such as wet or dry grinding, attriting, milling, sonication, etc. However, in those cases where the individual particles are extremely small, such as in the range of 10 to 100 nm, the agglomerates generally do not need to be broken up; rather, the agglomerates may be incorporated into the individual layers at the beginning of the processing procedure. When the thickness of the layers is reduced to the sub-100 nm level via pressing or rolling of the material as described herein, the agglomerates will simply deform during the plastic flow stage to conform to the desired layer thickness.

Some pastes or slurries may be made with an aqueous base, while others may require an organic or oil base. If immiscible solvents are utilized for the different layers, this assures non-wetting characteristics during the forming process. Other non-wetting systems may also be used. In addition to the solvent and the nanoparticles, the paste or slurry may also contain a binder, one or more lubricants, and other additives as required, such as dispersing agents and/or plasticizers. The additives may be adjusted by means known in the art, such as the use of the Zeta Potential, so that the particles remain well dispersed in the solvent.

The viscosity of the pastes and slurries should be adjusted with the solvent based on the application technique to be used. For slurry application procedures such as ink-jet deposition, silk screen printing, spraying, or use of a doctor blade, the viscosity should be low enough to spray or spread evenly. For pastes used in pressing and/or rolling procedures, the required initial viscosity is a function of the rate and extent of deformation, as well as of the processing temperature and other important parameters. The viscosity is characterized and adjusted to stay within the region that satisfies the continuity requirement for the layers after the last step, which could be n≅17. For the present invention, the viscosity should be such that it is possible to roll or press the pastes without deforming them in a manner that intermixes the individual layers.

Compacting

Referring to FIG. 1, the next step is fabricating a green nanolaminate (also referred to as greenware) by compacting two or more layers of pastes and/or slurries using at least one of rolling, pressing, wrapping, spraying, spreading, cutting, and stacking (Step 120). For rolling or pressing, two or more different pastes of the appropriate composition and viscosity (similar to the consistency of modeling clay) are placed in the sequence of layers as determined in Step 110. The thickness of the at least two different types of layers usually are, but need not be, equal to each other. The individual thickness and number of each type of layer in the starting stacked assembly will depend upon the application. In one embodiment utilizing only rolling or pressing, the sum of the starting layer thicknesses may be equal to the total thickness of the desired product. The assembled layers are then deformed and compressed or compacted into the green nanolaminate by pressing and/or one-dimensional rolling, for example, to decrease the thickness of the composite layer assembly, while assuring that the layers remain parallel to each other without intermixing. The final thickness after each compression is usually about one half of the original thickness, although it may be more or less than this value.

Following rolling and/or pressing, the green nanolaminate may then be cut in the middle, and the resulting pieces may be placed on top of each other or stacked in an orientation to ensure that dissimilar layers are in contact with one another. It should be noted that the assembled layers may also be cut into three or more pieces of substantially equal area that are subsequently stacked in the same manner. Alternatively, the assembled layers of the green nanolaminate may be folded back on themselves. However, folding is generally not as desirable as cutting and stacking because it is not possible to retain the sequence of dissimilar adjacent layers with folding. The deformation is then repeated with additional step(s) of rolling, pressing, and/or wrapping. The ultimate number of the repeated sequences of deforming, cutting, and/or stacking will depend on the structure that is being developed, with each iteration generally doubling the density of layers in the same original thickness.

In another embodiment, instead of cutting and stacking the nanolaminate layered structure, at any point in the layer thickness reduction process, the nanolaminate material may be wrapped on a large mandrel to produce a nanolaminate structure with many more layers than were initially wrapped onto the mandrel. Thus, if a large mandrel is used from the beginning of the process, the starting layer thickness of the at least two different materials may be very thin. When the desired number layers of nanolaminate are obtained, the material may be taken off the mandrel and may then be further rolled and/or pressed as desired.

In an additional embodiment, lower viscosity slurries containing the same ingredients but with a higher concentration of solvent may be sequentially sprayed and/or spread onto a substrate to produce a microlaminate. This lower viscosity material may be utilized in techniques such as spraying, inkjet printing, and silk screen printing that are unable to produce the nanometer-thick layers that are required for this technique. The substrate may be, for example, flat or in the form of a large diameter drum. The process utilizes a successive, sequential deposition technique so that neighboring layers are comprised of materials of different composition. Each repeated pass over the substrate with materials different from the previous layer may be preceded by at least a partial drying step before the deposition of the next individual layer. This drying step is generally needed to prevent the intermixing of adjacent layers and is accomplished from either the deposition side or the substrate side. After the desired total microlaminate thickness is achieved, the material may then be removed from the substrate.

At this point, the microlaminate may be dried or re-solvated to a paste-like consistency and then pressed or rolled to form the green nanolaminate comprising the final individual laminate layer thickness of less than 1 micron through single or multiple steps as previously described in the rolling and pressing procedure. Alternatively, two or more microlaminates may be stacked on top of each other as previously described, followed by re-solvating and rolling and/or pressing. In an alternative approach, the dried microlaminate material (including stacked microlaminates) may be re-solvated to a paste-like consistency and then wrapped around a large mandrel to achieve the desired number of layers as previously described. After the desired number of layers is achieved, the material is removed from the mandrel and then pressed and/or rolled to form the green nanolaminate comprising the final individual laminate layer thickness of less than 1 micron through single or multiple steps as previously described in the rolling and pressing procedure.

In some applications, depending on paste or slurry composition and humidity control, one or more steps of rolling or pressing in combination with cutting and stacking may be utilized to make the desired nanolaminate. However, these techniques alone are often unable to reduce the laminate layer thickness to the nanometer scale without distortion of the interface between the layers. Thus, utilizing a vast variety of materials, these techniques in combination with spraying, spreading, and/or wrapping are usually employed, with the final step being rolling or pressing.

At point during the step of fabricating the green nanolaminate (Step 120), it is possible to modify one or more of the interfaces (Step 145) to enhance and/or control the interface properties. In some embodiments, one or more interface additives may be applied to at least one of the exposed surfaces of the greenware or microlaminate. The interface additive generally comprises a liquid, suspension, emulsion, or paste, and the interface additive layer may comprise any thickness required for the properties of the laminate i.e. it may be thinner or thicker than the thickness of the at least two types of nanolaminate layers. The interface additive may also function as either an interface modifier or as an additional layer material between the other layer materials. For example, a non-wetting additive layer may be added between layers that would wet each other to keep the interfaces distinct during processing. Alternatively, the interface additive may be used to enhance one or more properties of the final nanolaminate material. The interface additives may be added by a variety of techniques, such as brushing, spraying, doctor blade, Mayer bar, physical vapor deposition, chemical vapor deposition, or atomic layer deposition. At any stage of processing, the thickness of the additive layer relative to the thickness of the at least two types of individual layers is determined by the thickness of the applied additive layer as well as by the thickness of the at least two layers of different composition in the layered structure at the time when the additive layer is applied. In other embodiments, one or more of the exposed surfaces of the greenware or microlaminate may be converted or modified by a process such as oxidation or carburization.

In FIG. 1, following Step 120, the green nanolaminate may undergo a final rolling and/or pressing step (Step 125), after which the green nanolaminate is de-watered, de-gassed, and burned-out (Step 130) to remove volatile components and other gaseous substances that may still be attached to the surface of the particles. This latter step is a normal step in the processing of powdered ceramic and metallic materials and involves the removal of the water, binders, lubricants, plasticizers, and other organic additives. The removal entails controlled-rate heating and holding procedures utilizing long intervals under vacuum (generally up to or exceeding 24 hours). The prolonged heating time is required because the spaces between nanosize particles are of extremely small size (below 1 nm), which makes the process of degassing very slow. The exact temperature/vacuum/holding time conditions will depend on the properties of the volatile components, the particle size of the starting nanopowders, and the amount of porosity acceptable in the final product.

Consolidation

After the fabrication and compaction steps (Steps 120 to 130), the green nanolaminate is consolidated or densified (Step 135) in such a way as to achieve uniformity and continuity of the resulting final nanolaminate. In some embodiments, the final density of the nanolaminate is at least 95% of the theoretical density of the material, and in other embodiments, the final density is at least 99% of the theoretical density. The theoretical density of a material is the density of the material without pores. This density is conventionally calculated using the unit cell volume, the material's chemical formula, and the number of formula units per unit cell.

This consolidation stage of nanolaminate fabrication in Step 135 may comprise one or more of the techniques of sintering, hot-pressing, hot rolling, dynamic compaction, liquid infiltration, plastic deformation, microwave heating or other densification method well-known in the art of consolidating and sintering of metals and ceramics that, individually or in sequence, are intended to yield fully-dense materials with varying degrees of coherency at the interfaces. These methods may also be aided by magnetic or electric fields in order to decrease time and temperature for the consolidation process and thus further reduce grain growth. In addition, microwave heating may accomplish the goal of obtaining near theoretical density without appreciable grain growth. Each of these techniques is able to essentially fully consolidate the green nanolaminate material and produce either incoherent, semi-coherent, or coherent interfaces.

The consolidation method(s) used in Step 135 should be chosen based not only on the nanomaterials comprising the individual layers but also on the desired properties of the final consolidated nanolaminate. Where incoherent interfaces are desired, short duration high temperature sintering (i.e. rapid or flash sintering), hot rolling, rapid hot pressing, and/or dynamic compaction may be utilized. In addition, high temperature, pressureless sintering may also be used, but it should be noted that this technique may cause some grain growth and may cause the phases to either separate or dissolve into each other. To produce the coherent interfaces without grain growth that are required for some applications described herein, a technique such as atomic templating via cold consolidation (ATCC), dynamic compaction, plastic deformation, liquid infiltration, microwave heating, and/or hot rolling is generally required to minimize grain growth of the two or more of different nanomaterials comprising the individual layers in the nanolaminates. For example, atomic templating utilizing magnetron sputtering is routinely employed to create materials that consist of interfaces that are atomically perfect. These interfaces yield all kinds of "colossal" properties, including super Young's modulus, colossal magnetic properties, and colossal oxygen conduction. These properties do not appear in nature because the materials are thermodynamically unstable and require sophisticated and complicated processing to produce them.

Magnetron sputtering is able to produce research-size samples, but the process requires expensive equipment and high vacuum. Thus, this technique is generally not feasible for production of industrial-size bulk samples at low cost. This invention uses a new approach to produce large bulk samples of nanolaminate materials with atomically-coherent, semi-coherent, or incoherent interfaces at a small fraction of the cost. This technique may consist of cold, elevated temperature, or explosive compaction of nanocoated nanoparticle at high-pressure (>0.3 GPa and preferably >1.0 GPa), which leads to densification via plastic deformation of the particles under pressure rather than via the diffusion-assisted flow mechanism that would require higher temperatures. Thus, the elevated consolidation temperature should be high enough to enhance plastic deformation but not high enough to cause grain growth and/or phase separation/dissolution.

For some nanolaminates requiring coherent interfaces, an optional post-consolidation heat treatment or annealing step (Step 140) may be added in order to develop the desired degree of coherency at the interfaces, after which the method terminates. This additional heat treatment in Step 140 may reduce or completely anneal out (if so desired) any stresses arising from the difference in thermal expansion coefficients of the materials comprising various layers in nanolaminate. For some applications, such remnant interlayer stresses could be an advantage, arresting the tips of the propagating cracks. The result of this annealing process at temperatures high enough to lead to atomic rearrangement, yet low enough not to cause grain growth, finishes the procedure and yields a fully-dense, bulk material consisting of nanosize layers with atomically perfect coherent interfaces between them. Particle growth is eliminated so that growing particles do not disrupt the network of interfaces.

Because IDnL materials are able to comprise nano-, micro, and macro-structure, the nano-aspects of this structure may be designed to be stable at the temperature of use. In addition, the interfaces are stable at those temperatures i.e. they should not produce eutectic reactions leading to the formation of liquid phases, and they should resist inter-diffusion, grain growth, and other high-temperature events that could destroy the structure of an IDnL material. In some applications, restricting grain growth within laminate layers is not as important, and it is desirable to let the grains grow and in some cases, to form single crystals within the layers. However, in many cases, it is desirable to limit grain growth within the layers in order to take advantage of the nanophase materials.

For the stability of IDnL materials at high temperatures, both the geometric uniformity of the layers and the phase stability should be addressed. Both of these issues are well-known in the field of materials science, and the methods for assuring stability of these materials even at the most extreme temperatures are known to those skilled in the art of extreme-temperature-capable structural materials. Only three methods will be mentioned here for illustrative purposes. The material in the layers may be seeded with larger crystallites, allowing subsequent crystallization to take place within individual layers, which assures coarse grain structure within the layers. To further assure stability, the composition of adjacent layers should be chosen from immiscible areas of phase diagrams, and diffusion inhibitors should be used at the interfaces.

Potential Fields of Use and Applications of IDnL Materials

The present invention provides significant flexibility to precisely tailor the properties of the final nanolaminate by adjusting the composition and structure of the materials comprising the layers, the exact sequence of dissimilar layers, the structure, chemistry, and sequences of the interfaces, the density of layers, and many other considerations about the exact structure of the nanolaminate material. For example, utilizing only ceramic layers in the nanolaminates may increase the mechanical reliability, work of fracture, and toughness of ceramics by making nanolaminate layers with weak interfaces that provide crack deflection. In addition, the ability to incorporate metal along with ceramic layers may further enhance strength and toughness of the materials. The high hardness of the internal layers, combined with the built-in weakness of the interfaces and specially-selected density of interfaces, may provide improved impact-resistance.

Incorporation of Functional and/or Smart Materials

The presently disclosed IDnL materials may incorporate materials with functional and/or smart properties. Due to their extreme flexibility in processing in which individual layer thickness, composition, and sequence may be controlled and varied, one or more layers comprising smart or functional materials may be inserted at will. For example, piezoelectric materials may be incorporated as layers. Neighboring metallic layers that function as electrodes may achieve excellent coupling between the field and the active material. In addition, magnetic particulates, shaped as required, may comprise one or more of the layers, and under the action of an applied magnetic field, the magnetic layers could drastically change the electrical and/or thermal conductivity of the IDnL material. In another application, the IDnL material may be made "self-sensing" by incorporating into it a few layers that would detect an applied stress tensor or structural damage.

Optical properties of the IDnL materials may be easily manipulated by a number of approaches. IDnL materials may be made transparent or opaque to a certain range of wavelengths by an application of an electromagnetic field. By using single crystal seed particles, the different neighboring layers may be converted into two-dimensional single crystals by a plane-limited crystal-growth method. Thus, the material may be made into an optical or radiation-filtering device in which some wavelengths are filtered out or focused in selected directions in a manner similar to X-ray diffraction. This property may be made tunable by placing a smart material in alternative layers or non-sequential layers. In addition, this same technology may be used to make thin layers of energy-producing material, such as the materials used in solar cells, with or without a backing material.

Fabrication of Solid Electrolytes with Improved Ionic Conductivity

The use of IDnL materials according to the present invention may be a promising approach to generate a new family of fast ion conducting materials that may be used as solid electrolytes in gas electrolyzers, electrochemical pumps, gas sensors, catalytic reactors, and most importantly, in fuel cells. Production of energy from fuel cells utilizing ethanol, methanol, natural gas, coal products, etc. is of great importance for use in a variety of applications such as transportation, stand-alone power, and residential power. Although this technology may have broad application such as in cation-conductors (lithium and sodium solid electrolytes), another example may be oxygen ion conduction, for which the most commonly utilized solid electrolyte is yttria-stabilized zirconia (YSZ). Although YSZ is the workhorse of the oxygen fuel cell industry, the low oxygen conductivity at temperatures below 800° C. is the major problem causing huge inefficiencies due to the thermal losses and the material degradation at the high temperatures required. Lowering the operational temperature even by 100° C. would give a big boost to this industry.

It should be noted that there are a few experimental materials with better oxygen conductivity than YSZ, such as gadolinia-doped ceria and lanthanum gallates; however, they are generally not used industrially because of their thermal instability, electronic contribution to conductivity, poisoning effects of sulfur, etc. In many conventional oxygen fuel cells, YSZ is used in the shape of a cylinder with two streams of different gases, one along the interior and the other at the exterior. Normally, fuel, in the form of gasified coal or natural gas, is blown on the inside of the cylinder, and an oxidizer such as air or pure oxygen is blown on the outside. The rate of movement of oxygen ions from the outside to the inside of this solid electrolyte cylinder, which depends on the conductivity of the material, is the key parameter for the efficiency and power output of such a fuel cell. YSZ has an oxygen conductivity of 0.1 S/cm at 1000° C. The smallest value of conductivity acceptable for the operation of the fuel cell is ten times lower i.e. around 0.01 S/cm. Thus, if a lower-temperature oxygen conductor is to find industrial applications, its conductivity should be at least 0.01 S/cm.

The instant invention may provide a novel approach and methodology for fabricating such a material i.e. a solid electrolyte with oxygen conductivity greatly superior to that of YSZ, potentially exceeding the room temperature (RT) conductivity of YSZ by 8 orders of magnitude. After optimization of processing, the novel material of this invention may have an RT oxygen conductivity near 0.01 S/cm, which would make possible industrial development of RT oxygen fuel cells (if appropriate low-temperature catalysts become available). This invention may also provide a novel approach to fabricate a cylinder from the material of choice in a simple and industrially-scalable manner.

One example of a multi-layered material with coherent interfaces is yttria-stabilized zirconia (YSZ) in which zirconia is stabilized with 8% yttria and layered with strontium titanate. See "Colossal Ionic Conductivity at Interfaces of Epitaxial $ZrO_2:Y_2O_3/SrTiO_3$ Heterostructures," J. Garcia-Barriocanal, et al., Science 321, 676 (2008). In this work, the YSZ samples consisted of a multitude of parallel, extremely fine, alternating layers (1-62 nm thick (YSZ) and 10 nm thick for $SrTiO_3$ (STO)) and were made using atomic templating utilizing magnetron sputtering. Because of the extremely fine features of these layers, the interfaces between the different layers acquire remarkably high oxygen-ion mobility. The oxygen conductivity along the $ZrO_2:Y_2O_3/SrTiO_3$ interfaces was found to be nearly 8 orders of magnitude greater than that of YSZ at 84° C. when the thickness of YSZ layers was 1 nm. However, even when the thickness of YSZ was as large as 62 nm, the conductivity of the samples was still 3 orders of magnitude higher than that of YSZ. This groundbreaking result was attributed to the coherent nature of the atomic interfaces that formed between the two phases during magnetron sputtering, creating large numbers of vacancies and low-activation barrier sites for oxygen ions that resulted in a high-mobility environment for oxygen ions.

Another plausible explanation for the $10^8$ enhancement in ionic mobility is that oxygen ions create a lattice gas structure in the thin, film-like region of the interface. The lattice gas is best described by the Ising model. The phenomenal mobility arises because oxygen ions create a perfectly ordered superlattice, albeit with some defects. These defects move with phenomenal ease because they assist each other and have very low activation energy of hopping. Thus, it follows that the thin, interfacial, film-like region must be essentially atomically perfect; otherwise, the effect disappears.

To achieve these breakthrough results, J. Garcia-Barriocanal, et al. used magnetron sputtering in a high vacuum chamber to grow the epitaxial heterostructures. The huge drawback of this technology for industrial applications is that the deposition rate in a magnetron is very slow (on the order of nm/min), and only relatively small samples (<1 sq. ft.) may be produced. These limitations make the technique inherently very expensive and cumbersome to use for fabricating any material except for extremely thin films. Making a cylindrical shape that is needed for fuel cell applications is also not feasible with the magnetron technology. Thus, any industrial applications of this remarkable scientific breakthrough are impractical as long as magnetron sputtering is utilized for making the material.

In contrast to the magnetron layered approach, the presently disclosed IDnL approach utilizes alternating, thin laminate layers of the relevant material pair. Thus, a coherent or semi-coherent interface may be formed between adjacent layers in the nanolaminate. As an example, after a laminate with at least 10 layers, preferably 1000, and more preferably at least 100,000 layers is formed as described above such as Steps 105 to 130 in FIG. 1, it may then be consolidated (Step 135 in FIG. 1) under high pressure (>0.3 GPa and preferably >1.0 GPa) at low temperature (i.e. <0.5 of the melting temperature) with short holding times (measured in minutes and preferably seconds) to produce semi-coherent interfaces. This may be preferably performed with dynamic compaction techniques, such as, with rapid pre-heating, in situ heating, adiabatic effects of compaction, microwave heating, and/or electric currents to achieve elevated temperatures. To obtain the highest-quality interfaces, the processing should be optimized by varying the pressure, temperature, and post-anneal combination until the best ionic mobility due to the improved coherency and continuity of the interfaces is obtained.

High-temperature pressureless sintering should not be employed where coherent interfaces are desired as high-temperature pressureless sintering would destroy the engineered interfaces either by dissolving them or as a result of grain growth. At these high pressures, the mechanism of consolidation of the material is fundamentally different from that of pressureless sintering. The material densifies via plastic flow, rather than the diffusion-assisted and flow that is characteristic of high-temperature pressureless sintering. Because the highly-conductive interfaces will quickly dissolve at temperatures that are required for the diffusion and viscous flow, high-temperature pressureless sintering should not be used for fabricating dense nanostructured fast ion conductors. After this stage, the density of the consolidated part should be above 95% of the full or theoretical density of the material. As the particles deform and consolidate into a dense nanolaminate, a continuous network of YSZ/STO interfaces is formed. These interfaces are the sites for the rapid oxygen ion mobility.

As shown by J. Garcia-Barriocanal, et al., the perfect coherency between YSZ and STO atomic lattices is essential for colossal ionic conductivity. Simply placing YSZ adjacent to STO is insufficient; the atomic rearrangement must take place and the coherent atomic planes must extend from one phase to another. The cubic fluorite lattice of YSZ grows rotated 45° to the c-axis of the perovskite structure of STO. The lattice constant of STO is 0.3905 nm and that of YSZ is 0.514 nm. As YSZ is rotated, it has to stretch because it is 7% ($0.514/2^{1/2}$=0.364 nm) too short to fit onto the 0.3905 lattice. This 7% strain leads to weakening of the bonds between ions, which lowers the activation energy of the ionic jump and leads to greatly increased ionic mobility. Also, a large number of oxygen vacancies are generated at the interface.

Using the presently disclosed methods, the interface coherency after the dynamic consolidation step may be significantly improved by a final, post-consolidation heat treatment or annealing step (Step 140 in FIG. 1), which may be used to develop essentially perfect atomic coherence of the interfaces without causing any undesirable grain-growth phenomena. After the dynamic consolidation step, the interfaces are highly strained and cold-worked. Large numbers of dislocations present as non-equilibrium high-energy structures. A mild anneal at slightly elevated temperature (200-400° C.) allows for atomic rearrangement to reconstruct the atomically coherent interfaces, which are thermodynamically stable at low temperatures. These temperatures are too low to produce grain growth.

As stated above with reference in Step 105 in FIG. 3, modeling is an important first step in the production of IDnLs. The following illustration shows the value of employing modeling to design a material dominated by interfaces. The calculation begins with tabulating the conductivity data for yttria-stabilized zirconia and the $SrTiO_3$-layered material, which is contained in the reference by J. Garcia-Barriocanal, et al. Table 1 contains the tabulated data from the conductivity-temperature plot in the reference.

In this illustration, the goal is to obtain, at lower temperatures, the conductivity equal to that of yttria-stabilized zirconia at 700° C., which is $10^{-2}$S, as this is the accepted value in industrial applications. This goal may be achieved by incorporating highly-conducting interfaces via layering pure zirconia with $SrTiO_2$ material. The issue is determining the density of $SrTiO_2$ layers needed to achieve the necessary value of conductivity ($10^{-2}$ S) at a lower temperature such as 200° C.

TABLE 1

Conductivity and Temperature Data

| Temperature (° C.) | Temperature (° K.) | 1000/T (1/° K.) | $ZrO_2$ Conductivity (S) σZr | $SrTiO_2$ interf. Conductivity (S) σI |
|---|---|---|---|---|
| 20 | 293 | 3.4 | $10^{-12}$ | $10^{-4}$ |
| 100 | 373 | 2.7 | $10^{-11}$ | $10^{-3}$ |
| 200 | 473 | 2.1 | $10^{-8}$ | $10^{-1}$ |
| 300 | 573 | 1.74 | $10^{-8}$ | 1 |

TABLE 1-continued

Conductivity and Temperature Data

| Temperature (° C.) | Temperature (° K.) | 1000/T (1/° K.) | ZrO$_2$ Conductivity (S) σZr | SrTiO$_2$ interf. Conductivity (S) σI |
|---|---|---|---|---|
| 400 | 673 | 1.5 | $10^{-4}$ | |
| 700 | 973 | 1.03 | $10^{-2}$ | |

The process may begin with modeling the layered material as two resistors in parallel: (1) pure yttria-stabilized zirconia; and (2) SrTiO$_2$/zirconia interfaces. The thickness of the interfaces is taken from the plot as 30 nm, and the calculation is done in terms of resistances.

The total resistance of the layered material $R_T$ is shown in Eq. (3):

$$R_T = \frac{R_{Zr} \cdot R_I}{R_{Zr} + R_I} \quad (3)$$

where $R_{Zr}$ is the resistance of zirconia and $R_I$ is the resistance of the interfaces.

For a sample of unit length and unit area, $R_T$ may be calculated as shown in Eq. (4):

$$R_T = \frac{1}{[(1-Nt)]\sigma_{Zr} + Nt\sigma_I} \quad (4)$$

In Eq. (4), N is the density of interfaces per unit thickness of the laminate, $\sigma_{Zr}$ and $\sigma_I$ are ionic conductivities of pure zirconia and the interfaces, respectively, as defined in Table 1, and t is the thickness of one interface (t=30 nm).

The ratio of resistivities of pure zirconia material to the layered material may be found using Eq. (5):

$$\frac{R_T}{R_{Zr}} = \frac{1}{\left[(1-Nt) + Nt\frac{\sigma_I}{\sigma_{Zr}}\right]} \quad (5)$$

Eq. (5) is the key equation for calculating the density of SrTiO$_2$ layers necessary to reduce the resistance of the layered material to the industrially-acceptable level indicated above. The value of $$\frac{\sigma_I}{\sigma_{Zr}}$$

for each temperature may be taken from the Table 1.

From Table 1, it is clear that at T=20° C. and 100° C., layering is of no use, as even the pure interfaces have conductivity below the goal of $10^{-2}$ S. However, at 200° C., the conductivity of the interfaces is $10^{-1}$S; thus, layering should be capable of achieving the industrial goal. At T=200° C., $$\frac{\sigma_{Zr}}{\sigma_I}$$

is equal to $10^{-7}$. 10,000 or $10^4$ layers per cm should be industrially achievable via the presently disclosed methods, and by taking N=$10^4$, a conductivity of $0.3\times10^{-2}$ may be calculated, which is of the order of magnitude, although slightly lower than, the industrially desired $10^{-2}$ S.

However, at T=300° C., the layering approach should work well, as $$\frac{\sigma_{Zr}}{\sigma_I}$$

is equal to $10^{-6}$. Eq. (5) then yields for N=$10^4$, $\sigma_T$=$3\times10^{-2}$S, which is three times the acceptable level of conductivity for fuel cells and is equal to that of pure yttria-stabilized zirconia at 700° C. Because the density of layers is equal to that of interfaces divided by two, the total number of layers is equal 5,000/cm, which should be easily achievable by the instant invention.

Similar calculations may be carried out at various temperatures to determine the ideal number of interfaces required at each temperature range of operation. For example, if the required operating temperature is 400° C. (potentially due to catalyst requirements), the number of layers to achieve conductivity of ~$10^{-2}$ S would be different from that at 300° C.

Fabrication of Semiconductor Materials

The presently disclosed IDnL materials and methods may be used to produce novel semiconductor materials that may play a major role in several new technologies such as nonlinear optics, luminescence, electronics, catalysis, solar energy conversion, and optoelectronics. It is well-known that the small dimensions of nanosize particles of semiconductors such as CdS and CdSe, for example, result in different physical properties from those observed in the "bulk" material. However, manufacturing bulk pieces from these materials is complicated. Currently, the only approach to fabricating such a material is via nanoassembly, which is greatly limited in the type of materials that may be used for capping of the nanoparticles and is not nearly as flexible as the presently disclosed methods.

The presently disclosed invention, however, may be amenable to manufacturing large samples. Using methods disclosed herein, a semiconducting material may form one laminate layer, while thiophenol or other material that allows for pressure-assisted consolidation and nanoassembly may form an adjacent nanolaminate layer. The interfaces between the two different laminate layers may be designed to generate specific energy levels for electrons or holes or to act as donor/acceptor regions where electrons or holes are created or absorbed. Thus, the semiconductor layer would act as an intrinsic semiconductor, whereas the other laminate material would act as an extrinsic semiconductor of either n- or p-type or would provide additional energy levels.

Fabrication of Superconductor Materials

The present invention may also have potential for scientific and engineering breakthroughs in superconducting materials, especially considering the recent discoveries of high-$T_c$ (transition or critical temperature) at interfaces of thin films. The discovery of high-$T_c$ superconductivity confined to nanometer-sized interfaces may lead to a numerous potential applications and may provide a great opportunity for manufacturing superconducting materials in bulk quantities via a nanolamination-type approach.

In essence, in normal metals, this interface phenomenon is suppressed because the high electron density limits interface effects such as carrier depletion or accumulation to a region much narrower than the coherence length, which is the scale necessary for superconductivity to occur. By contrast, in the high-$T_c$ 1-2-3 copper oxides, the carrier density is low, while $T_c$ is high and the coherence length is very short, which demands that the interfaces be perfectly coherent and atomically flat. However, the recently discovered superconductivity in bilayers consisting of an insulator ($La_2CuO_4$) and a metal ($La_{1.55}Sr_{0.45}CuO_4$), neither of which is superconducting in isolation, does not require perfect interface coherence and is highly robust. The resulting $T_c$ exceeds 50K. This enhanced superconductivity is shown to originate from an interface layer that is about 1-2 unit cells thick.

In summary, enhancement of $T_c$ in bilayer systems has been observed before; however, the role of the interfaces has never been fully recognized. The present invention may provide a low-cost manufacturing technique that has not previously existed to fabricate industrial-sized samples comprising superconducting materials.

Fabrication of Anisotropic Insulators

The IDnLs of the present invention may be useful as thermal barrier coatings. In many applications, such as in jet engine turbines, the components need to be protected from heat. This protection is necessary because there is a constant desire to increase engine temperatures so that the engine can operate at a higher thermodynamic efficiently and thus conserve fuel. Thermal barrier coatings have been in use for some time to deal with this problem of components operating in high temperature environments where their mechanical strength is severely degraded. These coatings allow the cooled mechanical part to be at a temperature significantly lower than the environment inside the engine and thus maintain the required mechanical properties. Although there has been success with thermal barrier coatings, there is still a need for materials with lower thermal conductivity and greater oxidation resistance.

Because of their specific design and structure, the process of energy transfer in the presently disclosed IDnL materials may be quite unique as compared to ordinary laminates and laminated materials because the energy transfer process in IDnLs should be entirely controlled by the properties of the interfaces and by the enormous number of these interfaces per unit length in the direction perpendicular to the area of the interfaces. In general, thermal energy transport through a solid is carried out via three basic processes: conduction, convection, and radiation. In the following discussion, convection is disregarded because IDnLs are basically solid materials with very little, if any, open space within them, making thermal motion of liquids or gasses in those spaces insignificant in the process of energy flow.

On the other hand, the other two mechanisms of energy flow are very important. In true IDnL materials, the flow of energy should be dependent only on the properties of the interfaces. Thus, the heat-conducting properties of materials that constitute the layer planes become inconsequential as the number of these planes increases. This makes IDnLs somewhat similar to reflective, thermally-insulating materials, although it should be noted that the process of energy reflection in IDnLs relates not only to the radiation carried by photons, as in ordinary reflective insulation, but also to the thermal flow carried by phonons in ceramics or electron conduction in metals as in ordinary thermally-resistive insulation. The interfaces in IDnL materials may be designed to be abrupt and discontinuous such that both photon-reflective and phonon-scattering properties are optimized, which makes the IDnL-type materials inherently superior heat insulators, especially at extreme temperatures where the radiative heat transport may become the dominant process of energy flow.

The following discussion is intended to give some pertinent fundamentals of the two processes of thermal energy transport and to give general guidelines for the design of IDnL thermal insulation. In any material, heat flux between two surfaces due to conduction is described by Eq. (6):

$$f = U(T_a - T_b) \tag{6}$$

where heat flux=q/A (rate of heat flow/area) [W/sec m$^2$]; U is the heat transfer coefficient; and $T_{a,b}$ are the surface temperatures. In the absence of internal barriers, U is simply equal to k/L, where k is thermal conductivity of the material of the surfaces and L is the distance between the surfaces.

However, when there are multiple surfaces present between the two surfaces, the equation for U becomes more complex as shown in Eq. (7):

$$U = \left( \sum_1^n R_i + \sum_1^n \frac{L_i}{k_i} \right)^{-1} \tag{7}$$

where $R_i$ is the heat transfer resistance at each interface and n is the number of layers.

As n increases, the first sum, the sum of $R_i$, also increases in direct proportion to n, whereas the second term, the sum of $L_i/k_i$, which is the resistances to heat flow via conduction within the layers, essentially remains constant and even slightly decreases due to the overall decrease of the total thickness of the material (a small change); thus, at some large n, the second term may be disregarded and the heat transfer coefficient becomes simpler as shown in Eq. (8):

$$U = \left( \sum_1^n R_i \right)^{-1} \tag{8}$$

Eq. (8) may be used as a working definition of a true IDnL material. It simply states that when the sum of $R_i$ is much greater than the sum of $L_i/k_i$, the IDnL material's total resistance to conducting heat flow is due entirely to the resistances at the interfaces, whereas the thermal conductivity of the material of the planes is irrelevant.

In addition to the process of thermal conduction, which is due to phonons and electrons (in metals), heat transport by radiation becomes very important at temperatures above 1,000° C. Here again, the properties of the interfaces and the large number of interfaces should be the key controlling parameters in containing the flow of radiative energy and reflecting the photons back to the source.

In designing the thermal insulation, it is very important to differentiate between the absorptive and reflective properties of the interfaces, as these properties lead to very different phenomena and consequently to very different insulating properties. Designing the interfaces with high absorption is not enough to stop radiation, as is discussed below. It is also essential to have interfaces with high reflectivity or coherent reflection of photons. If photons are only absorbed, then according to the Kirchhoff's law, the same intensity as is being absorbed would be emitted; thus, an array of black body-type absorbers provides only a temporary, transient barrier to incoming radiation. As the array heats up, the energy flow through it would become unimpeded. Thus, some degree of reflection or coherent scattering of photons at the interfaces in IDnL is essential for building superior extreme-temperature insulation.

The radiative energy transport is governed by the Stefan-Boltzmann law shown in Eq. (9):

$$W = \epsilon \cdot \sigma \cdot T^4 \tag{9}$$

where W is emissive power [W/sec m²]; $\epsilon$ is the emissivity of the surface ($\epsilon$=1 for black body; $\epsilon$=1 all others); T is the temperature of the surface; and a is the Stefan-Boltzmann constant.

If the interfaces in IDnLs are made of a black body-type material such as powdered carbon, for example, the emissivity of such interfaces would be very close to one ($\epsilon_c$=1). Such interfaces would form an array of black body absorbers and unless they are aggressively cooled, would provide only small, transient resistance to the flow of heat while the material is heating up. After this brief transient period, as one interface after another reaches the same temperature as the source—due to the absorption equal to unity—such an array of absorbers would provide virtually no impediment to radiative heat transfer because the radiative energy transport between each interface would be the same as given by Eq. (9).

However, if $\epsilon$<1, even just slightly less than one, then the temperature of each subsequent interface would be slightly less than the one in front of it. The temperature of the interfaces in this case may be approximated (neglecting multiple reflections) by Eq. (10):

$$T_n = \sqrt[4]{\frac{\varepsilon^n \cdot W_0}{\sigma}} \quad (10)$$

Eq. (10) illustrates that in an array of absorbing interfaces that have absorptivity and emissivity different from unity, the temperature of such interfaces goes down as the distance of the interface from the source increases. With higher emissivity, the decline is more gradual. Since emissivity of most materials except highly-polished metals like silver or aluminum is very close to one, it takes a very large n to achieve a significant decrease in the temperature of the interfaces, which is where the IDnL approach may become very powerful. By having a virtually unlimited number of interfaces, even weakly-reflective (yet highly refractory, thermally-stable, and mechanically strong), these interfaces may act as excellent reflectors of radiation due to their multitude.

The thermal conduction process should of course not be ignored. In ordinary thermal insulation, it is always a balancing act between the mechanical strength of the insulation and its heat conduction. In contrast, the presently disclosed IDnL materials, by virtue of having an extremely large number of interfaces facing the heat flow with each interface reflecting at least some photons and phonons back to the source, may be designed to have both high mechanical strength and superior resistance to both radiative and conductive heat transfer. The IDnL approach may truly be one of the best approaches to fabricating strong, tough, light, oxidation-resistant, impact-resistant, extreme-temperature insulation, particularly because IDnLs do not require incorporating porosity and lowering density, which makes the material mechanically weak, in order to limit the conduction of heat. In addition, because it is primarily the interfaces (preferably incoherent) in the IDnLs and not the materials from which the layers are fabricated that dominate in the reduction of heat transfer, the type of materials from which the layers are fabricated may be changed from low thermal conductivity materials to other material(s) in order to enhance one or more other properties of the nanolaminate insulator without significantly increasing the heat transfer.

Thus, one of the main advantages of the IDnL thermal insulating materials over insulation that currently exists may be that the IDnL materials may be made very strong and tough mechanically, as well as very thin, with superior thermal insulation properties at extreme temperatures in a direction about perpendicular to a plane of the individual layers. In fact, the higher the temperatures, the more clear the advantages of IDnL insulation over the conventional particulate or fiber-based insulation should be.

Fabrication of High Aspect Ratio Parts

It should be apparent from the previous discussion that depending on the manufacturing process used and the degree of interface coherency, IDnL materials may possess excellent thermal insulation properties in a direction about perpendicular to a plane of the individual layers comprising the nanolaminate. These thermal insulators are very anisotropic materials, with thermal resistance being 10 to 10,000 times as great in a direction about perpendicular to a plane of the individual layers in comparison to a direction about parallel to a plane of the individual layers. In addition, IDnL materials with highly coherent interfaces made according to the present invention may possess high levels of conductivity along the interfaces in a direction about parallel to the plane of the individual layers, making them suitable for use in fuel cells, for example.

The presently disclosed materials and methods may be extended, for example to the manufacture of tubes, rods, and other high aspect ratio parts that possess a desired cross-sectional shape and at least two thousand individual layers with interfaces of varying degrees of coherency. Thus, utilizing this invention, it is possible to fabricate IDnL materials with a length to diameter ratio (L/D) of at least five and preferably at least 100 using a process that preserves the desirable insulative or conductive properties of the constituent IDnL materials.

Figure 2A:
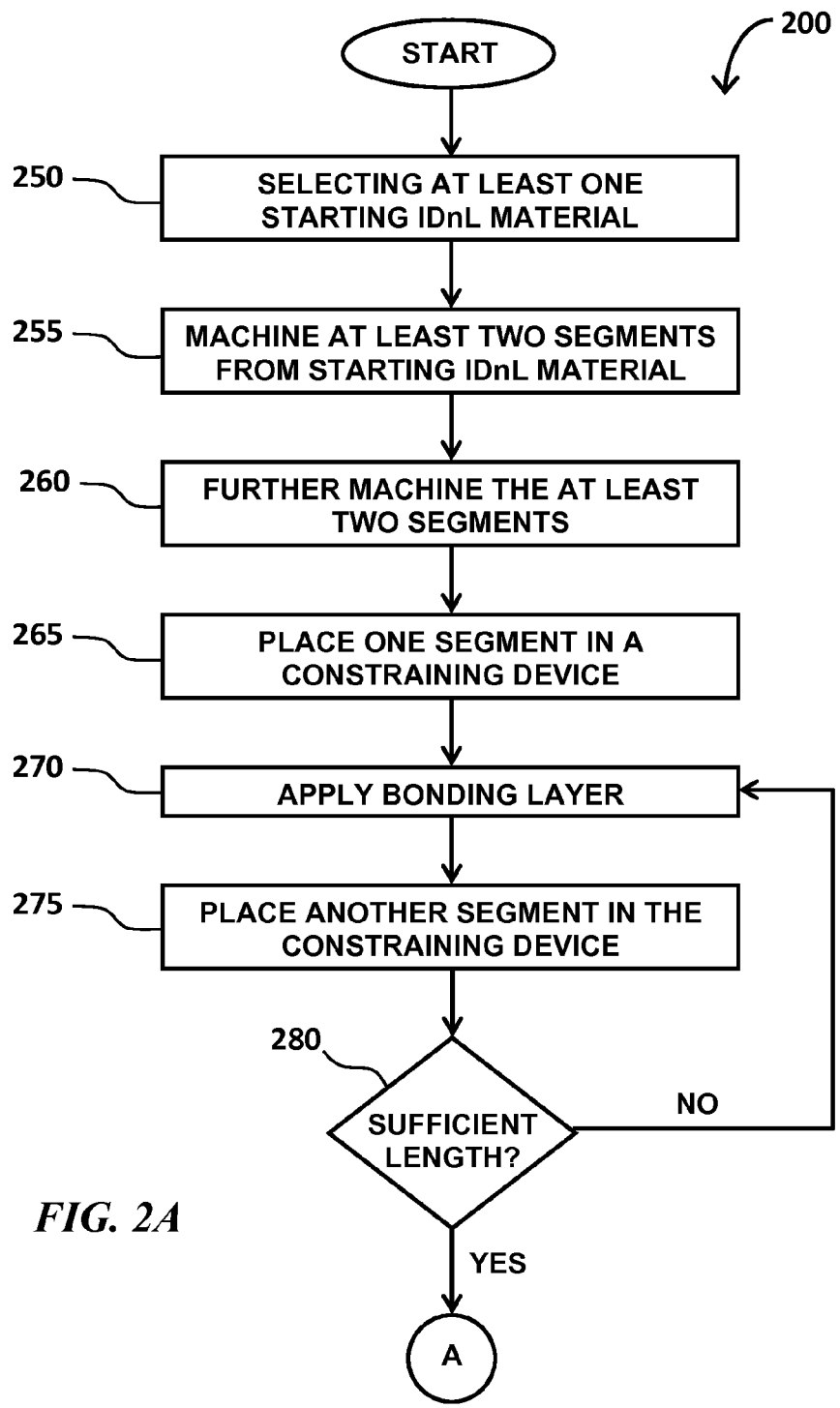
FIGS. 2A and 2B are flow diagrams illustrating an exemplary embodiment of a method for making a high aspect ratio part comprising an anisotropic nanolaminate material according to the present invention.
Figure 2B:
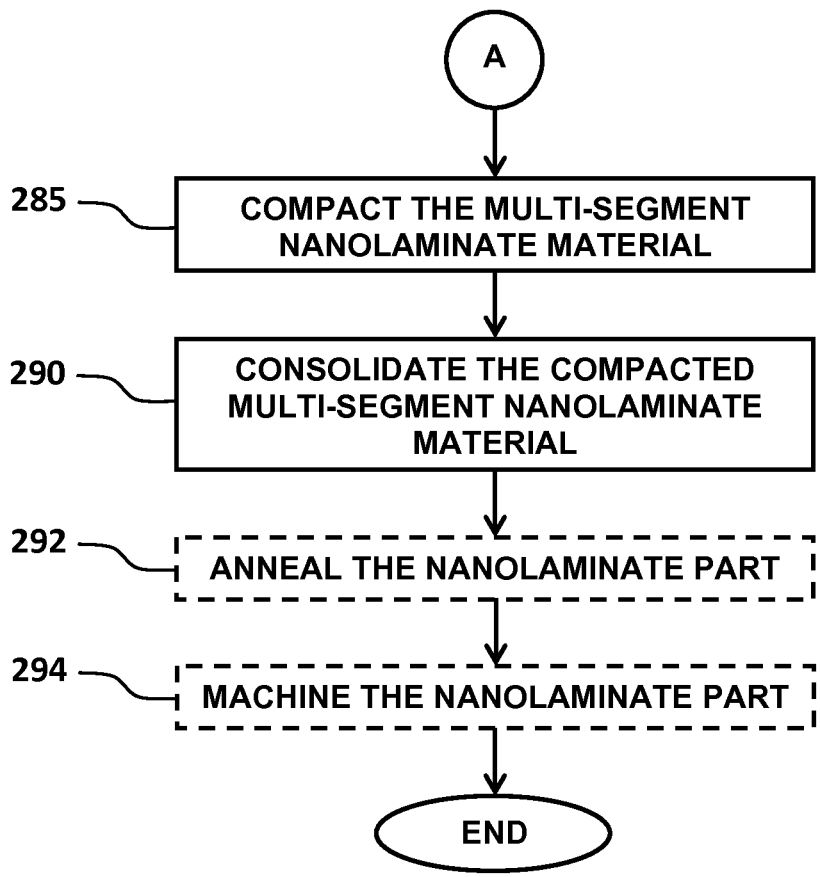

FIGS. 2A and 2B are flow diagrams or flowcharts illustrating an exemplary embodiment of a method 200 for making a high aspect ratio part comprising an anisotropic IDnL material. The method 200 begins in FIG. 2A with the step of selecting at least one starting nanolaminate (Step 250), which may be one or more IDnL materials manufactured according to the present invention. The starting nanolaminate material(s) should each comprise at least one thousand individual layers and should comprise at least two different nanomaterials, with adjacent layers each comprising a different nanomaterial composition. In some embodiments, the starting nanolaminate material(s) may comprise a compacted green nanolaminate such as the green nanolaminate material resulting from Step 125 in the method illustrated in FIG. 1. In other embodiments, the starting nanolaminate material(s) may comprise a consolidated low porosity nanolaminate, which may include one or more nanolaminate materials formed following a consolidation or post-consolidation step. For example, the consolidated low porosity nanolaminate may comprise the material formed following Steps 135 or 140 in FIG. 1. In some embodiments, the layer thickness of each of the individual layers in the starting nanolaminate material(s) is 1-100 nanometers.

In Step 255, at least two segments comprising the desired cross-sectional shape of the (final) high aspect ratio part are machined from the at least one starting nanolaminate material. The segments are produced by machining through the individual layers of the starting IDnL material (i.e. in a direction that is substantially perpendicular to a plane of the individual layers) so that the plane of the layers is substantially perpendicular to the major axis of the segments and ultimately, the major axis of the high aspect ratio part. In this context, the term "machining" may include a variety of suitable techniques such as cutting, drilling, coring, planing, boring, milling, and/or any other suitable manufacturing process(es) or combination(s) thereof. For example, where the high aspect ratio part comprises a cylindrical (solid) rod, the desired cross-sectional shape will be substantially circular, and the IDnL material may be machined to create multiple cylinders. As a further example, to form a high aspect ratio part comprising a hollow (substantially circular) tube, a central portion of each cylindrical segment may, for example, be drilled, bored, or cut out, while the external circumference may further be formed by a suitable technique such as milling, cutting, coring, etc.

Referring still to FIG. 2A, after production of the at least two segments from the starting IDnL material(s) in Step 255, the segments undergo additional machining (Step 260). In some embodiments, both ends of each segment are machined using a process such as cutting on a lathe or planing so that the ends are smooth and flat i.e. substantially parallel to the plane of the individual layers. In other embodiments, at least one other internal and/or external surface of the segments may be machined. For example, segments containing internal cavities, such as those intended to form a hollow tube, may undergo additional machining to smooth and/or shape the internal cavities.

Following the additional machining in Step 260, one of the segments is then placed in a suitable constraining device (Step 265) that substantially encompasses and constrains the segment in a manner such that the segment is not capable of translating radially i.e. the segment is prevented from moving in a direction substantially perpendicular to the axis of segment. The segment is placed in the constraining device such that a direction about perpendicular to the plane of the individual layers is in the vertical direction and such that one of the machined, end surfaces is accessible or exposed.

A bonding layer is then applied to the exposed, machined, end surface of the segment in the constraining device (Step 270). If the starting nanolaminate material chosen in Step 250 is a compacted green nanolaminate material or a consolidated low porosity nanolaminate, the bonding layer may comprise a slurry comprising the same composition as one of the layers of the starting nanolaminate material. If the segment comprises a consolidated low porosity nanolaminate, the bonding layer may alternatively comprise an adhesive, which may be used alone or in conjunction with the slurry. The adhesive may comprise, for example, a low-melting glass such as borosilicate or alumino-borosilicate with a melting temperature of 500-600° C.

Referring still to FIG. 2A, following application of the bonding layer in Step 270, another segment is placed in the constraining device on top of the first segment to form a multi-segment nanolaminate material (Step 275). The second segment is positioned such that one of its machined surfaces is in contact with the bonding layer applied to the first segment and such that the external shape of the two segments are matched around the exterior of the segments i.e. the two segments are located co-axially. The second segment is also constrained in a manner such that it is not capable of translating radially and such that one of its machined surfaces is accessible.

In Step 280, a determination is made whether the length of the multi-segment nanolaminate material is approximately equal to the desired total length of the final high aspect ratio anisotropic nanolaminate part. If the length of the multi-segment nanolaminate material is insufficient, the steps of applying a bonding layer to the accessible, machined surface of the topmost segment in the constraining device and placing and orienting another segment in the constraining device on top of that segment and in contact with the bonding layer (Steps 270 and 275) are repeated until the desired length is achieved.

Once the desired length is obtained, the method 200 continues in FIG. 2B where indicated with Step 285, in which the multi-segment nanolaminate material is compacted in a direction about perpendicular to the plane of the individual layers to form a compacted multi-segment nanolaminate material. The multi-segment nanolaminate material is compacted such that it is not deformed but rather maintains its original axial and cross-sectional shape. In like manner, the joint(s) comprising the bonding layer between the at least two segments is also compacted in a direction about perpendicular to the plane of the individual layers. Compaction in Step 285 may comprise any suitable method as described with respect to Step 125 in FIG. 1. In addition, because the multi-segment nanolaminate material is held within the constraining device, compaction may also be accomplished using other suitable methods, including, but not limited to, a screw clamp that secures to and/or contacts the two end segments and a ram or punch that contacts one or both end segments.

The compacted multi-segment nanolaminate material formed in Step 285 in FIG. 2B undergoes consolidation to produce the final high aspect ratio anisotropic nanolaminate part (Step 290) comprising at least two thousand individual layers and having the desired cross-sectional shape and a length:diameter ratio of at least five. The individual layers of the final nanolaminate part are numerous enough and thin enough such that one or more properties of the nanolaminate part are largely determined by the numerous interfaces between the adjacent layers, and to a lesser degree, determined by the properties of the two or more different nanomaterials comprising the individual layers. In some embodiments, the compacted multi-segment nanolaminate material may remain in the constraining device during the consolidation step, or in other embodiments, the compacted multi-segment nanolaminate material may be removed from the constraining device prior to consolidation. In other embodiments, the multi-segment nanolaminate material may be consolidated such that it is at least 95% of theoretical density.

Where the high aspect ratio anisotropic nanolaminate part is made from compacted green nanolaminate starting IDnL material(s), the entire material undergoes consolidation as described herein. Where the one or more starting IDnL materials are consolidated low porosity nanolaminates, compaction and consolidation occur mainly in the joints i.e. the bonding layer(s) between the segments.

Consolidation in Step 290 may include the use of one or more techniques that are suitable for the materials comprising the starting nanolaminate material and the bonding layer(s), including those discussed with respect to Step 135 in FIG. 1 such as atomic templating via cold consolidation, sintering, hot pressing, dynamic compaction, plastic deformation, liquid infiltration, microwave heating, and/or hot rolling. For example, where low-melting glass is used in one or more of the bonding layers, consolidation may include heating the compacted multi-segment nanolaminate material to 500-600° C.

In addition, as discussed previously, the process(es) used in the consolidation step in Step 290 should also be consistent with the desired properties and end use of the resulting anisotropic nanolaminate part. For example, where the nanolaminate part is to be used as a thermal barrier or a thermally-insulating part that requires incoherent surfaces, high temperature, pressureless sintering may also be used, which produces some grain growth at the interfaces as previously discussed. In some embodiments, the high aspect ratio anisotropic nanolaminate may be an insulator that has an axial (in a direction about perpendicular to the plane of the individual layers) resistance that is at least two orders of magnitude (power of ten) greater than a radial (in a direction about parallel to the plane of the individual layers) resistance. In the case of insulators, the incoherent interfaces between the adjacent individual layers increase the axial resistance. In contrast, also as previously discussed, a consolidation technique such as atomic templating via cold consolidation, hot pressing, dynamic compaction, plastic deformation, liquid infiltration, microwave heating, and/or hot rolling should be used to produce a nanolaminate requiring unbroken, highly coherent interfaces. In some embodiments, the high aspect ratio anisotropic nanolaminate part is thermally stable due to entropic stabilization.

The method may terminate following consolidation in Step 290, or in embodiments where it is desired that the final high aspect ratio anisotropic nanolaminate part possess coherent i.e. atomically perfect or near atomically perfect interfaces, the part may undergo an optional, post-consolidation annealing step (Step 292) to increase the degree of coherency at the interfaces. The annealing step may comprise any suitable method, such as those discussed with respect to Step 140 in FIG. 1, and should take place at an elevated temperature sufficient to cause atomic rearrangement such that a desired degree of coherency at the interfaces is developed. In some embodiments, following annealing, the anisotropic nanolaminate part is an ionic conductor in which the interfaces conduct ions in a radial direction i.e. in a direction that is substantially parallel to the plane of the individual layers and substantially perpendicular to the major axis of the part. In one embodiment of an ionic conductor, the at least two different nanomaterials comprise 8% yttria-stabilized zirconia and strontium titanate.

Following consolidation in Step 290 or annealing in Step 292, the high aspect ratio anisotropic nanolaminate part may also optionally undergo further machining (Step 294). The interior and/or exterior of the finished part may be subjected to additional machining as needed to smooth, shape, or otherwise modify the part to meet the requirements of the intended end use, after which the method terminates.

Fabrication of Nanolayered Magnetic Materials

The presently disclosed IDnL materials and methods may further be used for manufacturing bulk quantities of superior magnetic materials, which may be accomplished by having thin nanolaminate layers stacked up in many layers and being separated by an interfacial material. This approach, by virtue of protecting the size of starting nanoparticles in one direction by minimizing the laminate layer thickness, may be an ideal method for manufacturing magnetic materials of low cost and extremely high coercivity.

It is well-known that nanoparticles of magnetic materials show unusual and highly desirable magnetic behaviors when compared to comparable bulk materials. These behaviors are due to the interface effects such as symmetry breaking, electronic environment/charge transfer, and magnetic interactions. For example, nearly spherical and magnetically hard Fe, Co, and Fe(Co)—B-based particles in the size range of 7-20 nm possess an effective anisotropy and coercivity that is one to two orders of magnitude higher than in the bulk materials. The highest coercivities are obtained in capped particles that have a core/shell morphology with a metallic core surrounded by a ($Fe_2O_3$/$Fe_3O_4$ or berthollide) oxide shell consisting of small grains. Theoretically, the large coercivities have been attributed to an exchange interaction between the core and shell moments at the interface, which may be easily modified and controlled by the methods described herein.

The surface/interface effects, as well as the intra- and inter-particle interactions on the magnetic properties of nanoparticles of rare earth metals and inter-metallic compounds with high anisotropy, are expected to be of great importance to magnetic recording media, as the drive for higher density media requires isolated particles with size below 10 nm and coercivity greater than 3 kOe. Transition metals and their alloys have a low anisotropy and become super-paramagnetic below this size. It is thought that by controlling the magnetic properties of the interfacial regions (increasing the exchange interaction via incorporating magnetic oxides of Co), very useful magnetic materials for future magnetic recording may be produced.

Fabrication of Magnetostrictive Materials

The presently disclosed IDnL materials and methods may also be useful in the production of magnetostrictive materials. The magnetostrictive phenomenon refers to the deformation of a material in a magnetic field. Advanced magnetostrictive materials have possessed great technological importance for many years. In all applications, the system efficiency depends critically on the relative change in length (l=DI/I) as a function of the applied field. Values of DI/I on the order of $200 \times 10^{-6}$ with a field smaller than 200 Oe are desired. However, this range is generally not possible with existing materials, which require saturation fields of tens of kOe. Nanostructured materials are potential candidates that may lead to the desired properties through atomic engineering. Such properties may be obtained in amorphous or nanocrystalline alloys with reduced anisotropy and in multilayers with alternate stacks of high magnetostrictive materials and soft magnetic materials that are exchange coupled. With the instant invention, samples with giant magnetostriction may be prepared. Some preliminary results on amorphous $Tb_{33}Fe_{67}$/$Fe_{80}B_{20}$ multilayers are promising, with high transverse magnetostriction of $600 \times 10^{-6}$ obtained in field around 2 kOe.

Fabrication of Materials for Hydrogen Storage

The IDnL materials and methods disclosed herein may be suitable for fabricating materials for hydrogen storage at ambient pressure and temperature. For this application, the capability of the presently disclosed methods to fabricate mesoporous nanostructures in a highly controlled manner to produce hierarchically-ordered nanostructures may be a key advantage.

Hydrogen storage materials, by definition, must have extremely high interfacial area to physisorb, chemisorb, or simply absorb the hydrogen molecule. Also, the ideal material should have extremely well-dispersed and interconnected porosity, similar to the structure of human lungs. For the rapid, controllable release of hydrogen gas, the nanopores that contain hydrogen are connected to larger pores and channels to allow for pressure control. The IDnL materials and methods described herein and interface-controlled materials and methods (described in related U.S. patent application Ser. Nos. 12/938,463 and 12/938,462, which include exemplary methods to fabricate high density materials from coated nanoparticles) may be combined to produce such extremely complex hierarchical structures. Moreover, the chemistry of the interface that would accept the hydrogen material and the host material that would physisorb the hydrogen may be easily varied to achieve the optimum properties. For this application, the preferred starting materials are LiH and other hydrides that have been shown to have high affinity for hydrogen. Also, activated carbon nanotubes and various sub-stoichiometric carbides capped with catalytic and protective metals and organics are ideally amenable for this approach.

Fabrication of Individual Layers Using a Multi-Layer Process

The same manufacturing techniques described herein to manufacture IDnL materials, such as the method described in FIG. 1, may be used with one or more additional steps to produce other materials. For example, the fabrication of individual, discrete, thin layers of various materials such as, for example, polycrystalline silicon for photocells may utilize similar processing steps. By careful selection of the materials contained in one or more of the initial greenware layers and of the additive and/or processing steps between the rolling, spraying, spreading, wrapping, and/or pressing steps, the integrity of the final nanolaminate may be diminished to the point where it may be separated into one or more individual, thin layers. Thus, the final product is no longer a layered nanocomposite but rather a collection of individual discrete or small groups of layers with thicknesses that are controlled by the thicknesses of the original layers, as well as n, the number of rolling and/or pressing steps. If n is on the order of five and the thickness of an initial greenware layer is 1 mm, the thickness of the final discrete layers will be approximately 30 microns ($2^5$=32 and 1 mm/32=31.25 microns). This thickness is acceptable for example, for a photovoltaic solar cell.

Thus, continuing with the example of n is five, a greenware may be laid-up with 1 mm thick paste comprising nanometer- or micron-sized silicon particles in a binder with additional additives. This greenware may be placed on a substrate plate coated with a de-bonding agent. After five rolling and/or pressing steps each incorporating re-application of the de-bonding agent, 32 silicon layers each approximately 30 microns thick may be formed. In this rolling process, the sample is rolled or pressed to approximately half of its original thickness, cut in half, and coated on one half with de-bonding agent. The other half is then stacked on the first half in such a way as to maintain de-bonding agent between each silicon layer. Alternatively, instead of employing a de-bonding agent between each layer as they are stacked, it is possible to utilize a de-bonding agent or sacrificial material as the second layer in the starting material.

After the fifth rolling and/or pressing step, a heat treatment may be carried out to create the dense polycrystalline silicon layer, as well as to remove the de-bonding agent and/or sacrificial material. Assuming a rolling process is employed, very long photocells could be produced with a width and length that could be controlled by the size of the rollers and the length of the feed and take-up tables or belts. Conceivably, very large crystallites could be grown, especially if "seed" silicon crystals are incorporated into the initial silicon paste along with the silicon particles that are preferably elongated or needle shaped with an aspect ratio of at least five and preferably at least 10, as well as a minimum dimension equal to the final thickness of the layer or less. Once the crystallization heat treatment is concluded, the discrete layers may be separated into alternating sheets of silicon. However, it would be preferable to separate the sheets before they are fully heat treated and crystallized. The silicon layers could then be attached to a supporting layer such as glass or polymer.

Alternatively, a greenware layer of photocell backing material may be co-processed with the 1 mm silicon layer. The initial thickness of the backing material would be determined by the final thickness needed for mechanical strength. A de-bonding agent could be applied to the top of the initial silicon paste layer, as well as to the top of each silicon paste layer before it is cut or folded and placed on top of the other stacked assembly during each subsequent rolling and/or pressing step. This would produce 32 discrete layers of crystallized silicon attached to the backing material after five rolling and/or pressing steps, with each step incorporating reapplication of the de-bonding agent. The properties of the backing layer are selected to survive processing of the silicon, as well as to optimize the performance of the photovoltaic silicon layer.

A final adaptation of this individual layer concept is the elimination of the de-bonding agent, which may be replaced with a sacrificial layer that is removed by suitable means after the crystallization heat treatment. These means could include, but may not be limited to, solvation, etching, oxidation, and/or other chemical or physical processes, as well as longitudinal slicing along a direction of the layers, or a combination thereof. This adaptation may have the added benefit of maintaining the integrity of the layered composite during the rolling and/or pressing operations. Conceivably, use of a de-bonding agent could lead to layer separation during or after one of the rolling and/or pressing steps, which would greatly complicate subsequent processing steps.

The discrete layers or small groups of layers produced by this multiple rolling or pressing process may have advantages over thin layers of material produced as single or individual layers by other methods. Because layers produced according to the present invention are constrained in the multiple rolling process by another material on each face and they are rolled or pressed multiple times, the layers should be more uniform in thickness and composition, have lower roughness, and have larger grain size as they are constrained to grow in only two directions.

While this invention has been described with respect to specific embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A batch or continuous process for fabricating a high aspect ratio anisotropic nanolaminate part with a length:diameter ratio of at least five and a desired cross-sectional shape, the process comprising the steps of:
   a) selecting at least one starting nanolaminate material comprising at least one thousand individual layers, wherein each of the individual layers has a layer thickness ranging from 1 nm to 1000 nm and comprises at least two different nanomaterials, and adjacent layers comprising different nanomaterial compositions;
   b) machining the at least one starting nanolaminate material in a direction about perpendicular to a plane of the individual layers to produce at least two segments comprising the desired cross-sectional shape, wherein each of the at least two segments comprises a first end and a second end;
   c) machining a surface of each of the first end and the second end of each of the at least two segments to produce a first machined surface and a second machined surface, wherein each surface is machined such that the first machined surface and second machined surface are substantially parallel to the plane of the individual layers;
   d) placing a first segment into a constraining device such that the first machined surface is accessible, wherein the constraining device prevents radial movement of the first segment;
   e) applying a bonding layer to the first machined surface;
   f) placing a second segment in the constraining device such that the second machined surface of the second segment is in contact with the bonding layer and such that the first machined surface of the second segment is accessible, wherein the constraining device prevents radial movement of the second segment with respect to the first segment and positions the second segment such that the first segment and the second segment are located co-axially to form a multi-segment nanolaminate material;

g) repeating steps (e) and (f) until a total length of the multi-segment nanolaminate material is approximately equal to a desired total length of the high aspect ratio anisotropic nanolaminate part;

h) compacting the multi-segment nanolaminate material in a direction about perpendicular to the plane of the individual layers to form a compacted multi-segment nanolaminate material; and i) consolidating the compacted multi-segment nanolaminate material to produce the high aspect ratio anisotropic nanolaminate part with the length:diameter ratio of at least five and the desired cross-sectional shape, wherein the high aspect ratio anisotropic nanolaminate part comprises at least two thousand individual layers, the individual layers being numerous enough and thin enough such that at least one property of the high aspect ratio anisotropic nanolaminate is mainly determined by a plurality of interfaces between the adjacent layers and to a lesser degree by properties of the at least two different nanomaterial compositions comprising the individual layers.

2. The batch or continuous process of claim 1 wherein the layer thickness of each of the individual layers is 1-100 nanometers.

3. The batch or continuous process of claim 1 wherein the high aspect ratio anisotropic nanolaminate part is thermally stable due to entropic stabilization.

4. The batch or continuous process of claim 1 wherein the step of consolidating further comprises consolidating the compacted multi-segment nanolaminate material to at least 95% of theoretical density.

5. The batch or continuous process of claim 1 further comprising removing the compacted multi-segment nanolaminate material from the constraining device prior to consolidating.

6. The batch or continuous process of claim 1 further comprising machining the high aspect ratio anisotropic nanolaminate part.

7. The batch or continuous process of claim 1 wherein the step of consolidating the multi-segment nanolaminate material comprises utilizing at least one technique selected from the group consisting of atomic templating via cold consolidation, hot pressing, dynamic compaction, plastic deformation, liquid infiltration, microwave heating, and hot rolling.

8. The batch or continuous process of claim 7 further comprising annealing the high aspect ratio anisotropic nanolaminate part at an elevated temperature sufficient to cause atomic rearrangement such that a desired degree of coherency at the interfaces is developed.

9. The batch or continuous process of claim 8 wherein the high aspect ratio anisotropic nanolaminate part is an ionic conductor, wherein the interfaces are coherent, unbroken, and continuous and conduct ions in a radial direction.

10. The batch or continuous process of claim 9 wherein the at least two different nanomaterials are selected from the group consisting of 8% yttria-stabilized zirconia and strontium titanate.

11. The batch or continuous process of claim 1 wherein the step of consolidating the compacted multi-segment nanolaminate material comprises utilizing at least one technique selected from the group consisting of short duration high temperature sintering, high temperature pressureless sintering, hot rolling, rapid hot pressing, and dynamic compaction, wherein the interfaces are incoherent.

12. The batch or continuous process of claim 11 wherein the high aspect ratio anisotropic nanolaminate part is an insulator that has an axial resistance that is at least two orders of magnitude greater than a radial resistance.

13. The batch or continuous process of claim 1 wherein the at least one starting nanolaminate material is a compacted green nanolaminate.

14. The batch or continuous process of claim 13 wherein the bonding layer is a slurry comprising one of the at least two different nanomaterials comprising the compacted green nanolaminate.

15. The batch or continuous process of claim 1 wherein the at least one starting nanolaminate material is a consolidated low porosity nanolaminate, wherein the step of compacting the multi-segment nanolaminate material comprises compacting a joint that comprises the bonding layer and wherein the step of consolidating the compacted multi-segment nanolaminate material comprises consolidating the joint.

16. The batch or continuous process of claim 15 wherein the bonding layer is selected from the group consisting of a slurry and an adhesive, wherein the slurry comprises one of the at least two different nanomaterials comprising the consolidated low porosity nanolaminate.

17. The batch or continuous process of claim 16 wherein the adhesive comprises at least one low-melting glass.

18. The batch or continuous process of claim 17 wherein the low-melting glass is selected from the group consisting of borosilicate and alumino-borosilicate.

\* \* \* \* \*